United States Patent
Matsuoka et al.

(10) Patent No.: US 7,435,499 B2
(45) Date of Patent: Oct. 14, 2008

(54) FUEL CARTRIDGE FOR FUEL CELL AND FUEL CELL

(75) Inventors: Kei Matsuoka, Kawasaki (JP); Atsushi Sadamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/888,515

(22) Filed: Aug. 1, 2007

(65) Prior Publication Data

US 2008/0032167 A1    Feb. 7, 2008

(30) Foreign Application Priority Data

Aug. 7, 2006   (JP) .............................. 2006-214815

(51) Int. Cl.
*H01M 8/02* (2006.01)
*H01M 2/00* (2006.01)

(52) U.S. Cl. .......................................... 429/34; 429/38

(58) Field of Classification Search ........................ None
See application file for complete search history.

(56) References Cited

U.S. PATENT DOCUMENTS

| | | | |
|---|---|---|---|
| 6,766,817 B2 | 7/2004 | da Silva | 137/1 |
| 6,918,404 B2 | 7/2005 | Dias da Silva | 137/132 |
| 7,066,586 B2 | 6/2006 | da Silva | 347/85 |
| 7,285,255 B2 | 10/2007 | Kadlec et al. | 422/305 |
| 2004/0067394 A1* | 4/2004 | Sadamoto et al. | 429/12 |
| 2006/0154132 A1* | 7/2006 | Misawa | 429/34 |
| 2007/0212281 A1 | 9/2007 | Kadlec et al. | 422/292 |

FOREIGN PATENT DOCUMENTS

| | | |
|---|---|---|
| JP | 2003-92128 | 3/2003 |
| WO | WO 98/21772 | 5/1998 |

OTHER PUBLICATIONS

Machine Translation, Japanese Patent 2003-092128, Satomura et al. (Mar. 2003).*

* cited by examiner

*Primary Examiner*—Jessica Ward
*Assistant Examiner*—Phoebe Riner
(74) *Attorney, Agent, or Firm*—Ohlandt, Greeley, Ruggiero & Perle, L.L.P.

(57) ABSTRACT

A fuel cartridge for a fuel cell includes a casing configured to detachably connect to a predetermined position on the cell and having a connecting port communicated with a supply port of the cell, a fuel holding pack belt housed in the casing and including fuel holding packs holding fuels for the cell, respectively, the packs being arranged in a predetermined direction and connected to one another such that the belt can flex along the predetermined direction, and a belt conveying mechanism configured to convey the belt in the casing in the predetermined direction such that the packs pass over the connecting port of the casing. The pack is opened at the connecting port of the casing by a pack opening mechanism and the fuel in the pack is supplied to the supply port of the cell. The cell includes a fuel absorber in the fuel supply port.

19 Claims, 9 Drawing Sheets

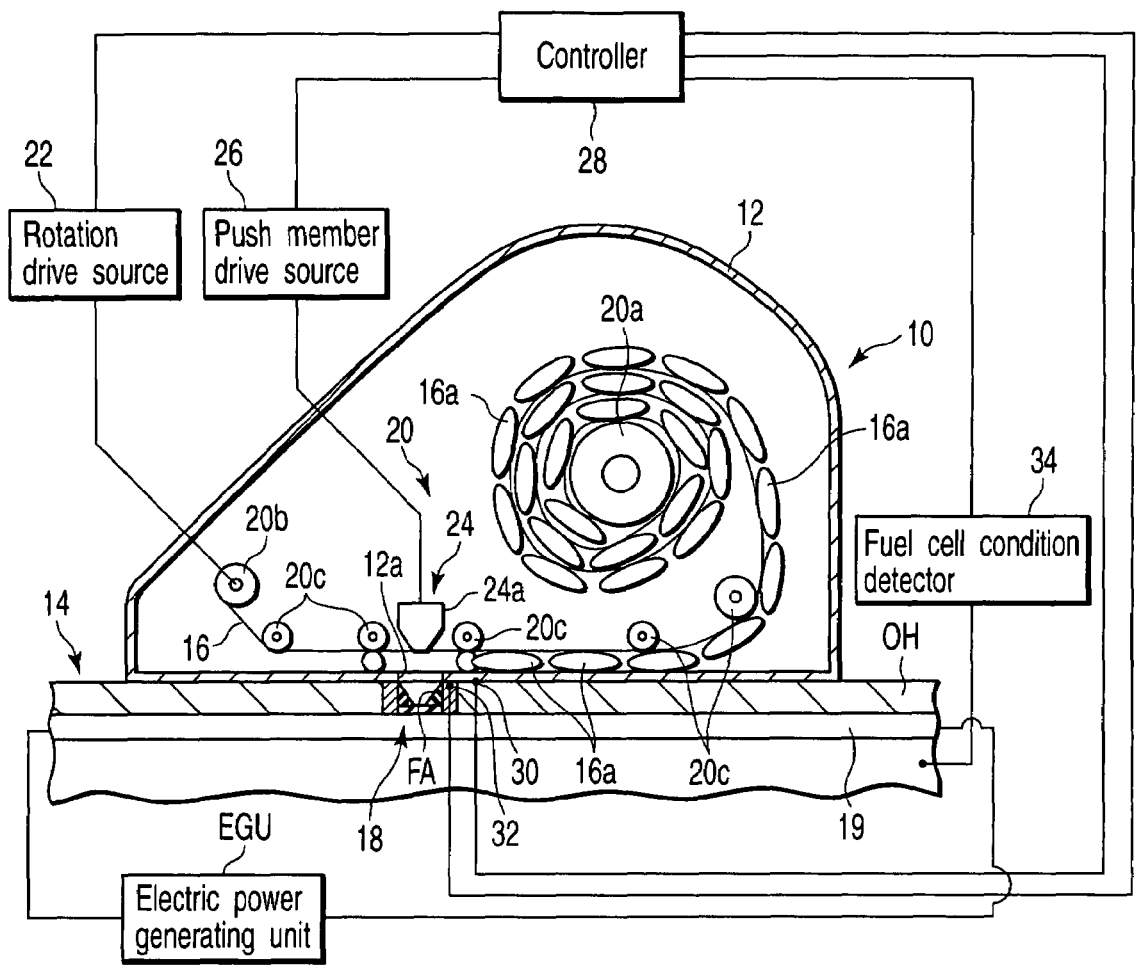
F I G. 1 A
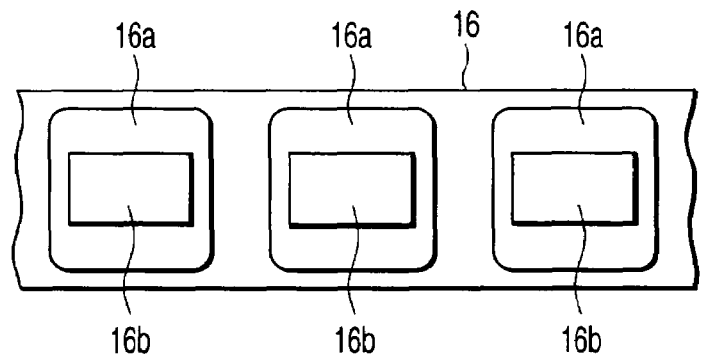
F I G. 1 B

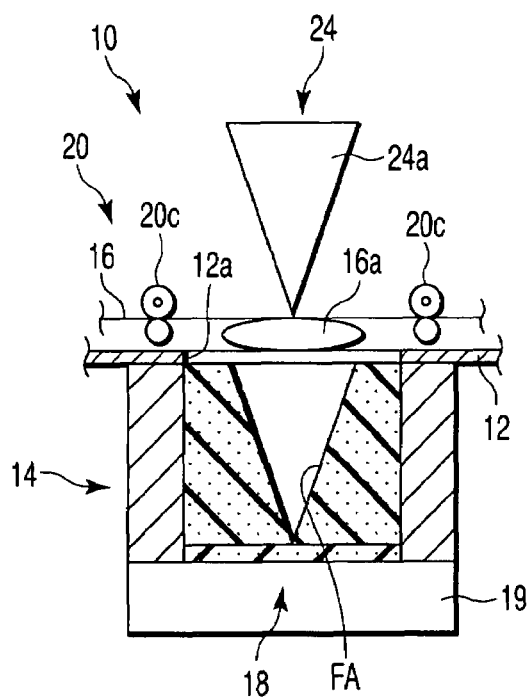
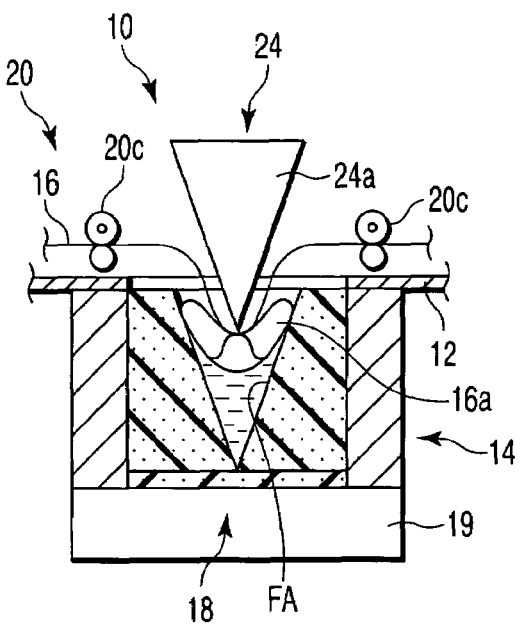
FIG. 2A  FIG. 2B
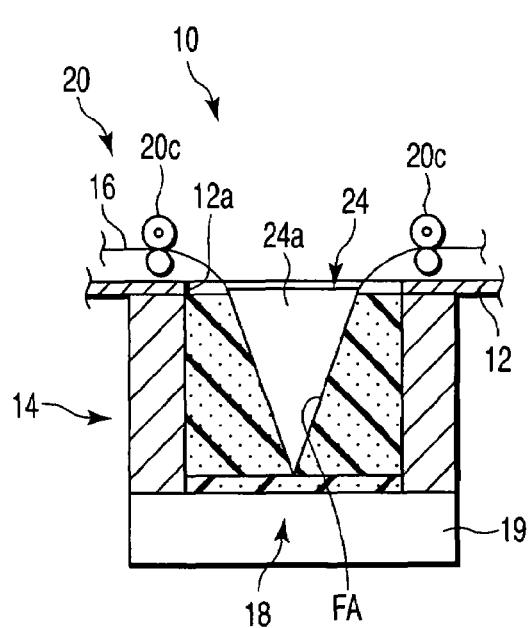
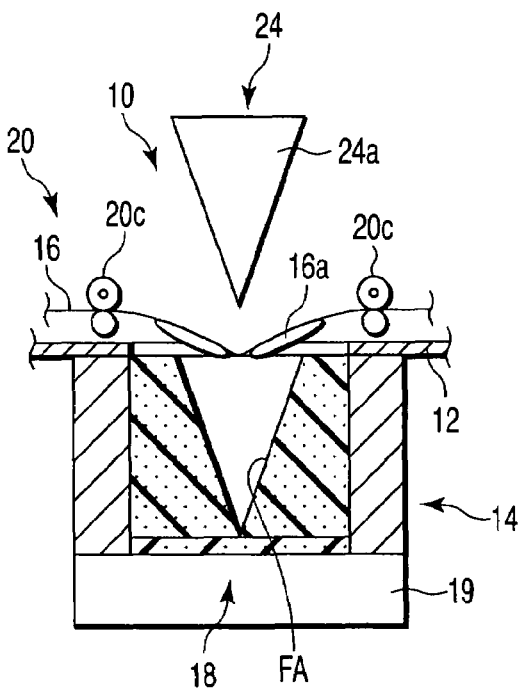
FIG. 2C  FIG. 2D

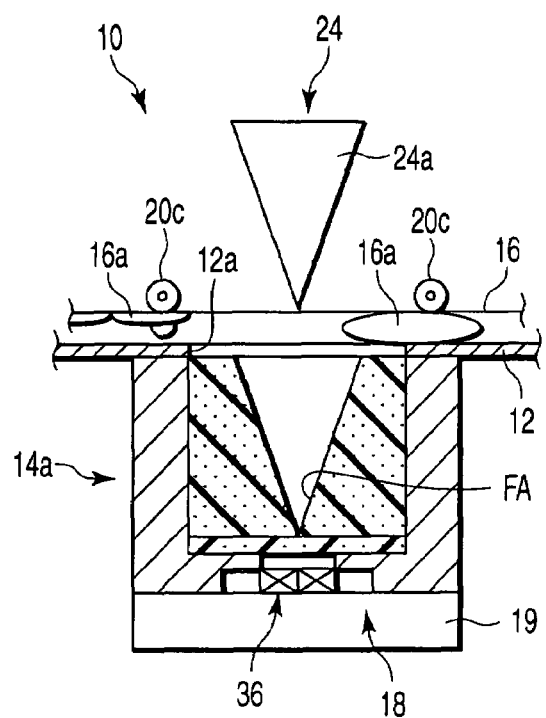 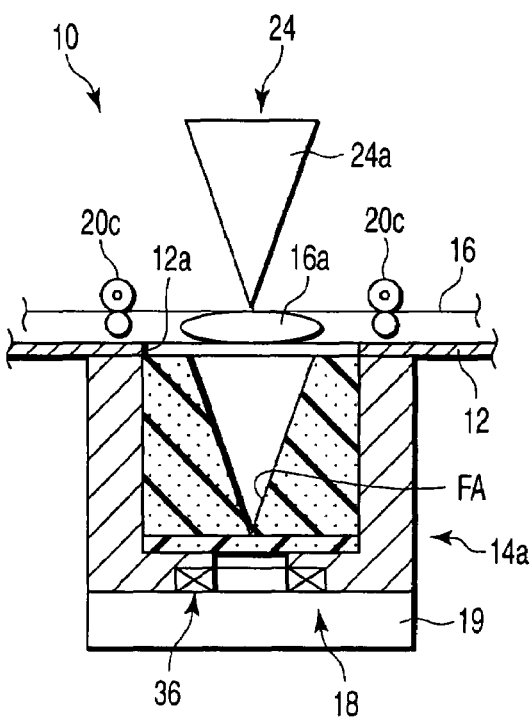
FIG. 3A    FIG. 3B
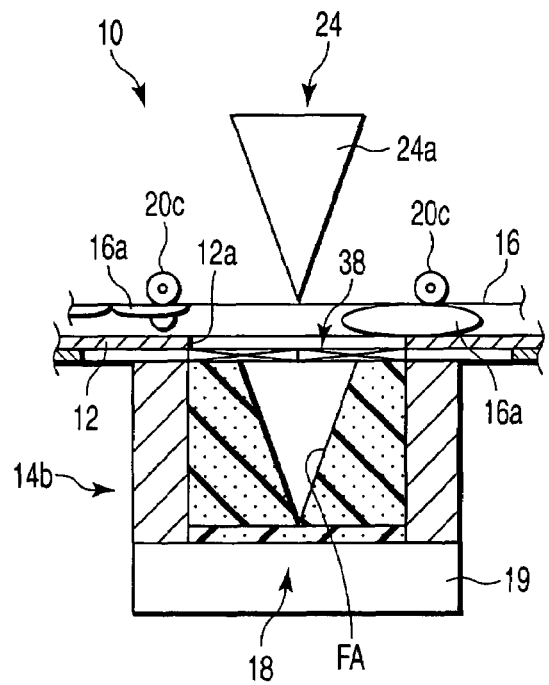 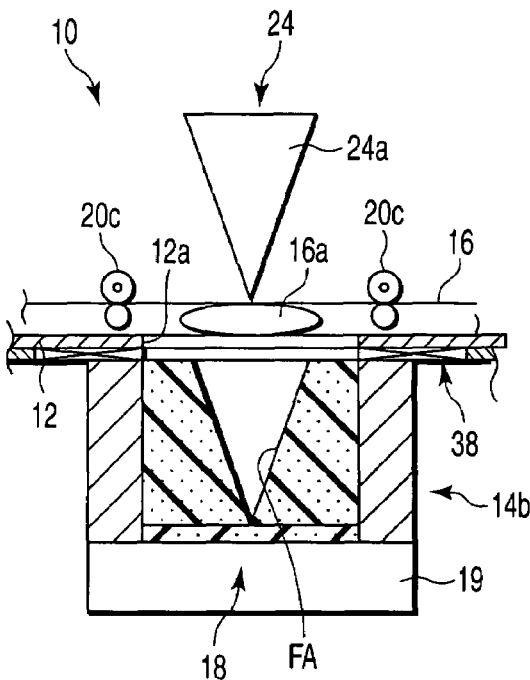
FIG. 4A    FIG. 4B

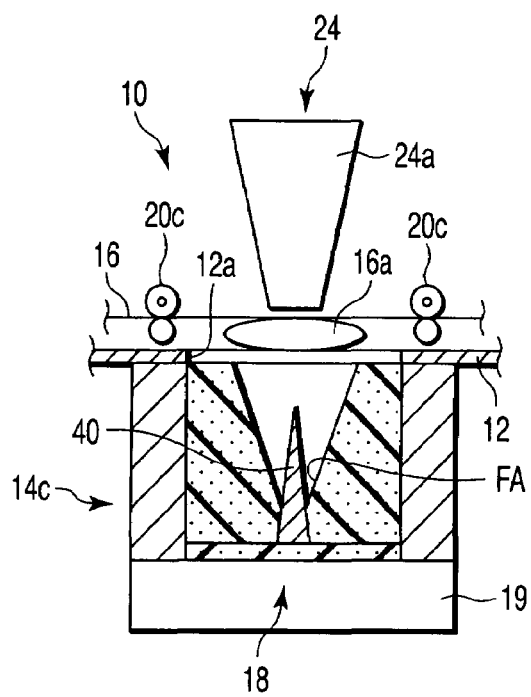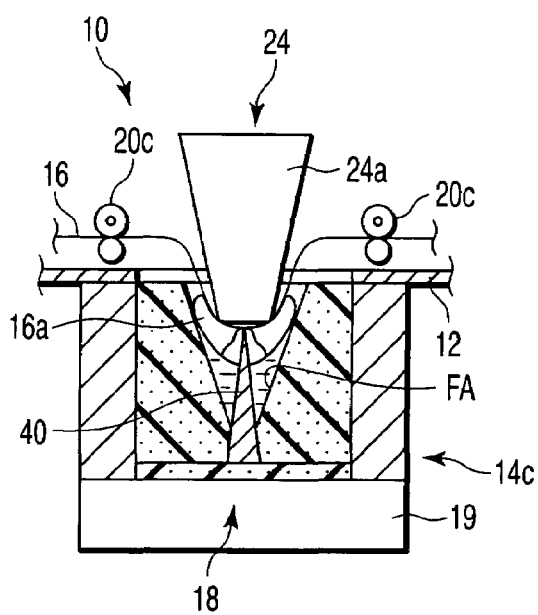
FIG. 5A    FIG. 5B
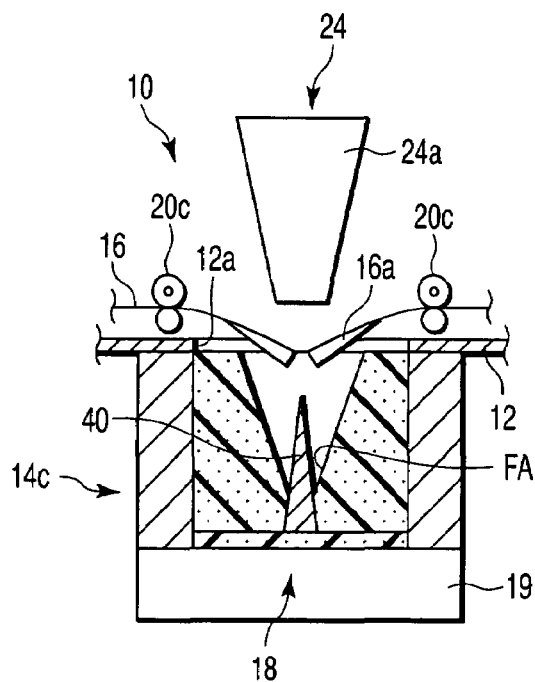
FIG. 5C

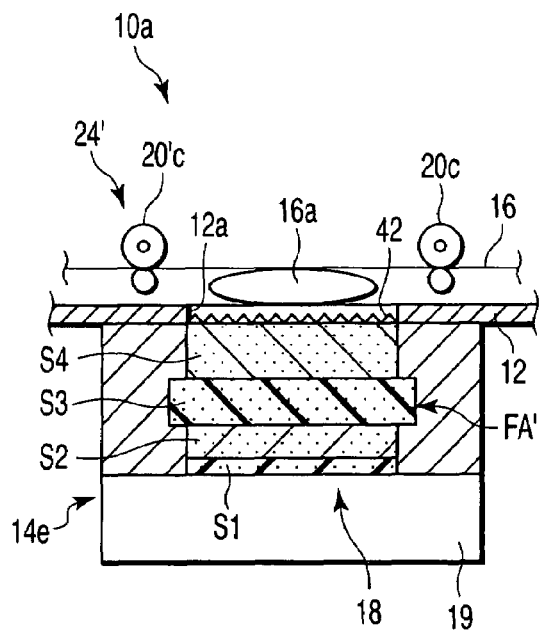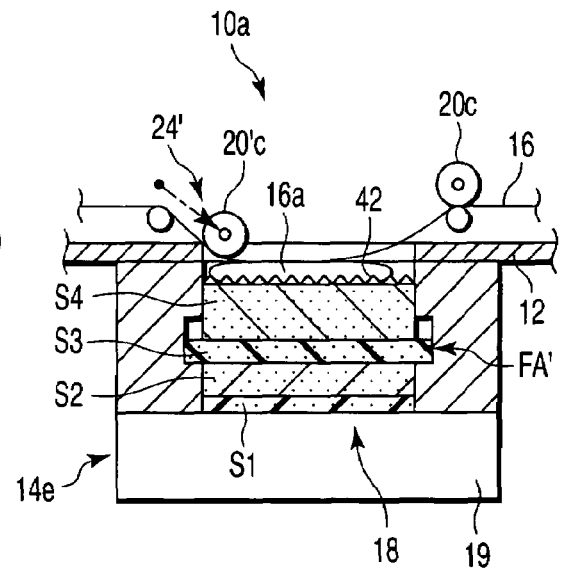
FIG. 7A    FIG. 7B
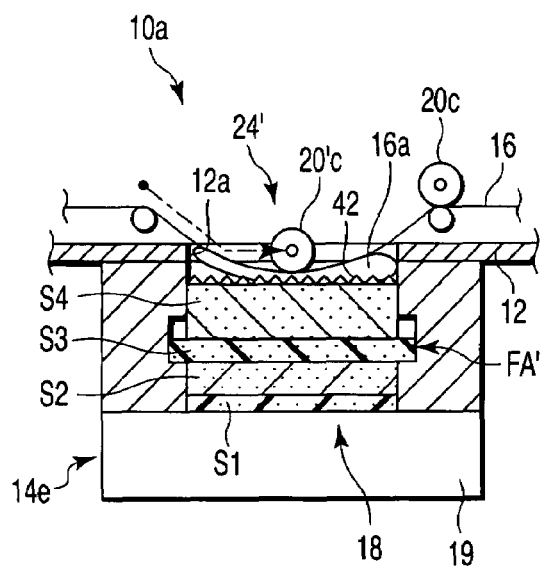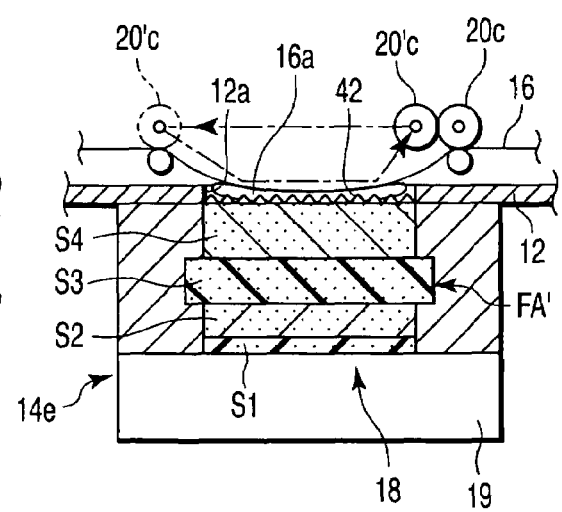
FIG. 7C    FIG. 7D

FUEL CARTRIDGE FOR FUEL CELL AND FUEL CELL

CROSS-REFERENCE TO RELATED APPLICATIONS

This application is based upon and claims the benefit of priority from prior Japanese Patent Application No. 2006-214815, filed Aug. 7, 2006, the entire contents of which are incorporated herein by reference.

BACKGROUND OF THE INVENTION

1. Field of the Invention

One embodiment of the present invention relates to a fuel cartridge for a fuel cell and a fuel cell using the fuel cartridge.

2. Description of the Related Art

For example, a conventional fuel cartridge for a fuel cell which has been known from JP-A-2003-92128 (KOKAI) is provided with a casing with high rigidity for enduring external force and a bag housed in the casing to hold fuel for a fuel cell. In the fuel cell using the fuel cartridge described in the above publication, when the fuel cartridge is assembled at a predetermined position, a hollow needle at the predetermined position is pierced into the bag of the fuel cartridge and fuel in the bag is sucked through the hollow needle by a suction pump.

BRIEF SUMMARY OF THE INVENTION

According to one aspect of the invention, a fuel cartridge for a fuel cell, comprises: a casing configured to detachably connect to a predetermined position on the fuel cell and having a connecting port communicated with a fuel supply port of the fuel cell; a fuel holding pack belt housed in the casing and including a plurality of fuel holding packs holding fuels for the fuel cell, respectively, the fuel holding packs being arranged in a predetermined direction and connected to one another; a conveying mechanism configured to convey the fuel holding pack belt in the casing in the predetermined direction such that the fuel holding packs pass over the connecting port of the casing, and an opening mechanism opening the fuel holding pack corresponding to the connecting port of the casing, wherein the fuel holding pack belt can flex along the predetermined direction, and the fuel in the fuel holding pack is supplied to the fuel supply port of the fuel cell.

According to one aspect of the invention, a fuel cell, configured to be detachably connected with the fuel cartridge for a fuel cell described above at a predetermined position, and including a fuel supply port to be supplied with fuel from the connecting port of the casing of the fuel cartridge detachably connected to the predetermined position, comprises: a fuel absorber provided in the fuel supply port and absorbing the fuel supplied from the fuel cartridge.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a vertical sectional view schematically showing a state in which a casing of a fuel cartridge for a fuel cell according to a first embodiment of the present invention is detachably connected to a predetermined position of a fuel cell according to a first embodiment of the present invention;

FIG. 1B is an enlarged plan view of a part of a fuel holding pack belt used in the fuel cartridge in FIG. 1A;

FIG. 2A, FIG. 2B, FIG. 2C, and FIG. 2D are schematic vertical sectional views sequentially showing, in the fuel cell assembled with the fuel cartridge in FIG. 1A, how a push member of a fuel holding pack opening mechanism of the fuel cartridge pushes one fuel holding pack on the fuel holding pack belt of the fuel cartridge toward a fuel supply port of the fuel cell through a connecting port of the casing of the fuel cartridge and opens the fuel holding pack to supply fuel from the opened fuel holding pack to the fuel supply port;

FIG. 3A is a schematic enlarged and vertical sectional view of a fuel supply port of a first modification of the fuel cell according to the first embodiment, in which an opening and closing device provided at the fuel supply port of the fuel cell is closed;

FIG. 3B is a schematic enlarged and vertical sectional view of the fuel supply port of the fuel cell of the first modification shown in FIG. 3A, in which the opening and closing device provided at the fuel supply port is opened;

FIG. 4A is a schematic enlarged and vertical sectional view of a fuel supply port of a second modification of the fuel cell according to the first embodiment, in which an opening and closing device provided at the fuel supply port of the fuel cell is closed;

FIG. 4B is a schematic enlarged and vertical sectional view of the fuel supply port of the fuel cell of the second modification shown in FIG. 4A, in which the opening and closing device provided at the fuel supply port is opened;

FIG. 5A, FIG. 5B, and FIG. 5C are enlarged vertical sectional views sequentially and schematically showing, in a combination of the fuel cartridge according to the first embodiment and a third modification of the fuel cell according to the first embodiment, how the fuel supply pack on the fuel holding pack belt of the fuel cartridge is pushed by the push member of the fuel holding pack opening mechanism of the fuel cartridge into a fuel supply port of the third modification of the fuel cell, opened by a fuel holding pack breaking and opening member in the fuel supply port of the third modification and then moved from the fuel supply port;

FIG. 7A, FIG. 7B, FIG. 7C and FIG. 7D are schematic vertical sectional views sequentially showing, in a combination of the fuel cartridge for a fuel cell according to the second embodiment and a modification of the fuel cell according to the second embodiment, how the push member of the fuel holding pack opening mechanism of the fuel cartridge pushes the fuel holding pack on the fuel holding pack belt of the fuel cartridge toward a fuel supply port of the fuel cell through the connecting port of the casing of the fuel cartridge and opens the fuel holding pack to supply fuel from the opened fuel holding pack to the fuel supply port;

DETAILED DESCRIPTION OF THE INVENTION

Figure 6A:
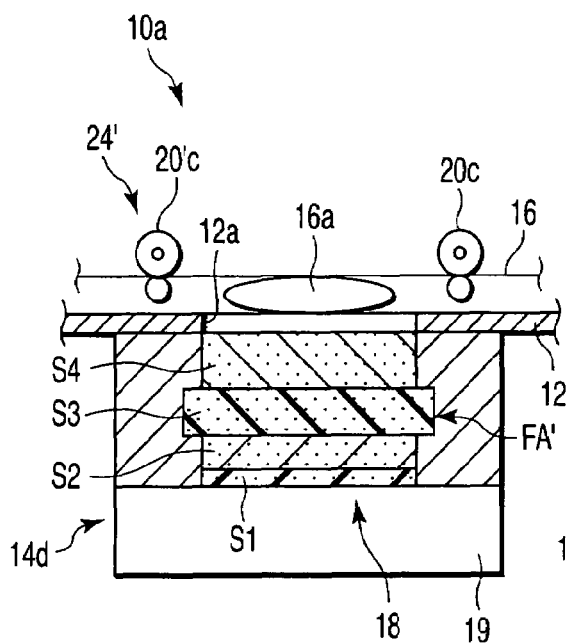
FIG. 6A, FIG. 6B, FIG. 6C and FIG. 6D are schematic vertical sectional views sequentially showing, in a combination of a fuel cartridge for a fuel cell according to a second embodiment of the present invention and a fuel cell according to a second embodiment of the present invention, how a push member of a fuel holding pack opening mechanism of the fuel cartridge pushes a fuel holding pack on a fuel holding pack belt of the fuel cartridge toward a fuel supply port of the fuel cell through a connecting port of a casing of the fuel cartridge and opens the fuel holding pack to supply fuel from the opened fuel holding pack to the fuel supply port.

Hereinafter, fuel cartridges for a fuel cell according to various embodiments of the present invention and fuel cells according to various embodiments and various modifications of the present invention used in combination with such fuel cartridges for a fuel cell will be explained with reference to the accompanying drawings.

First Embodiment

First, a fuel cartridge 10 for a fuel cell according to a first embodiment of the present invention and a fuel cell 14 according to a first embodiment of the present invention and used in combination with such a fuel cartridge 10 for a fuel cell will be explained with reference to FIG. 1A to FIG. 2D.

As schematically shown in FIG. 1A, the fuel cartridge 10 according to the first embodiment includes a casing 12 configured to be detachably connected by a known connecting mechanism (not shown) to a predetermined position on an outer surface of an outer housing OH of the fuel cell 14 according to the first embodiment. A fuel holding pack belt 16 is housed in the casing 12, and FIG. 1B shows a plan view of a part of the fuel holding pack belt 16 in an enlarged manner.

A fuel supply port 18 is opened at the predetermined position of the outer surface of the outer housing OH of the fuel cell 14. The casing 12 of the fuel cartridge 10 has a connecting port 12a to be communicated with the fuel supply port 18 of the fuel cell 14 while the casing 12 is connected to the predetermined position on the outer surface of the outer housing OH of the fuel cell 14.

A known sealing member (not shown) is disposed around the fuel supply port 18 in the outer surface of the outer housing OH of the fuel cell 14, around the connecting port 12a in the outer surface of the casing 12 of the fuel cartridge 10, or around each of them, to encircle the fuel supply port 18, or the connecting port 12a, or each of them. The known sealing member (not shown) ensures a connection between the fuel supply port 18 of the outer housing OH of the fuel cell 14 and the connecting port 12a of the casing 12 of the fuel cartridge 10 in a sealed state while the casing 12 of the fuel cartridge 10 is detachably connected to the predetermined position on the outer surface of the outer housing OH of the fuel cell 14.

The fuel supply port 18 of the outer housing OH of the fuel cell 14 is provided with a fuel absorber FA which absorbs fuel supplied thereto. It is preferable that the fuel absorber FA is made from porous material, and it is further preferable that it also has elasticity. The fuel supply port 18 is communicated with a fuel supply path 19 located in the outer housing OH. The fuel supply path 19 is connected to a known electric power generating unit EGU which is provided in the outer housing OH and which uses the fuel supplied through the fuel supply path 19 to generate electric power.

The fuel holding pack belt 16 housed in the casing 12 of the fuel cartridge 10 includes a plurality of fuel holding packs 16a holding fuel for a fuel cell respectively, and the plurality of fuel holding packs 16a are arranged in a predetermined direction and connected to one another so that the fuel holding pack belt 16 can flex along the predetermined direction.

The fuel holding pack belt 16 is formed from a material whose quality is not deteriorated for a predetermined period by a kind (for example, ratio of components and/or concentration of each component) of fuel held in each of the fuel holding packs 16a. An example of such a material is: either one material of polycarbonate (PC), polyamide (PA) containing nylon 6, polypropylene (PP), polyester including polyethylene terephthalate (PET), polyacetal (POM), polyethylene (PE), polyvinyl chloride (PVC), polytetrafluoroethylene (PTFE), ethylene-tetrafluoroethylene copolymer (ETFE), polymethylpentene (TPX), ethylene-vinyl acetate copolymer (EVA), polyurethane (PU), polyetherimide (PEI), polyphenylene sulfide (PPS), and ultrahigh molecular weight polyethylene (UHMWPE); or a copolymer of two or more materials selected from the above materials; or a synthetic made of two or more materials selected from the above materials; or fiber reinforced resin including glass-fiber-reinforced polyester (FRP) or resin laminate including polyethylene laminate and polypropylene laminate.

The plurality of fuel holding packs 16a of the fuel holding pack belt 16 can hold the same kind of fuels (for example, ratio of components and/or concentration of each component), and can hold plural kinds of fuels. Further, each of the fuel holding packs 16a can hold fuel quality guarantee material such as, for example, inert gas, for preventing quality loss of fuel, together with fuel.

When the fuel holding packs 16a of the fuel holding pack belt 16 hold plural kinds of fuels, the fuel holding pack belt 16 can include recording mediums 16b in which information pieces corresponding to the plural kinds of fuels held in the fuel holding packs 16a respectively are recorded. Such a recording medium 16b can be one of various kinds of known recording mediums such as a bar code, a combination of various symbols including, for example, a numeral, a character, or a figure except for the bar code, an IC tag, etc.

The recording medium 16b can be disposed at a predetermined position or predetermined plural positions on the outer surface of the fuel holding pack belt 16. The predetermined plural positions at which the recording mediums 16b are disposed on the outer surface of the fuel holding pack belt 16 can be positions corresponding to the fuel holding packs 16a and including outer surfaces of the fuel holding packs 16a, respectively, as shown in FIG. 1B.

The fuel cartridge 10 is provided with a fuel holding pack belt conveying mechanism 20. The conveying mechanism 20 conveys the fuel holding pack belt 16 in the casing 12 in the predetermined direction in which the fuel holding packs 16a of the fuel holding pack belt 16 are arranged, so that the fuel holding packs 16a pass over the connecting port 12a of the casing 12.

In the present embodiment, the fuel holding pack belt conveying mechanism 20 includes a pair of feed roller 20a and wind-up roller 20b arranged at two separate positions in the casing 12. Both end portions of each of the feed roller 20a and the wind-up roller 20b are rotatably supported by the casing 12.

In the present embodiment, the fuel holding pack belt 16 is long and narrow in the predetermined direction, and one end portion thereof positioned in the predetermined direction is fixed to the wind-up roller 20b, and the other end portion thereof positioned in a direction opposite to the predetermined direction is fixed to the feed roller 20a.

The fuel holding pack belt conveying mechanism 20 further includes a plurality of guide rollers 20c. These guide rollers 20c guide an intermediate portion of the fuel holding pack belt 16 extending between the feed roller 20a and the wind-up roller 20b in the casing 12, so that the intermediate portion passes over the connecting port 12a of the casing 12.

In a new fuel cartridge 10, as shown in FIG. 1A, only the one end portion of the fuel holding pack belt 16 is fixed to the wind-up roller 20b and the intermediate portion of the fuel holding pack belt 16 is not wound up on the wind-up roller 20b, and the intermediate portion is wound up on the feed roller 20a except for a portion thereof extending from the wind-up roller 20b up to near the feed roller 20a through the guide rollers 20c. In this initial state, the fuel holding packs 16a are positioned in a range from just before the connecting port 12a to the other end portion fixed to the feed roller 20a on the intermediate portion of the fuel holding pack belt 16.

Rotation force is transmitted to the wind-up roller 20b of the fuel holding pack belt conveying mechanism 20 from a rotation drive source 22 such as a motor. The rotation drive source 22 can be disposed in an inner space of the casing 12 or disposed near the aforementioned predetermined position on the outer surface of the outer housing OH of the fuel cell 14. In the latter case, the rotation drive source 22 is detachably connected to the wind-up roller 20b when the casing 12 of the fuel cartridge 10 is detachably connected to the aforementioned predetermined position on the outer surface of the outer housing OH of the fuel cell 14.

A power source (not shown) for the rotation drive source 22 can also be a battery disposed in the inner space of the casing 12 or in the fuel cell 14 or can be an external power source in an outside of the fuel cell 14.

In a case that the power source (not shown) is disposed in the inner space of the casing 12 and the rotation drive source 22 is disposed near the aforementioned predetermined position on the outer surface of the outer housing OH, the power source (not shown) and the rotation drive source 22 are configured to be electrically connected to each other when the casing 12 of the fuel cartridge 10 is detachably connected to the aforementioned predetermined position on the outer surface of the outer housing OH of the fuel cell 14. To the contrary, even in a case that the power source (not shown) is disposed in the fuel cell 14 or the power source (not shown) is an external power source in the outside of the fuel cell 14, and the rotation drive source 22 is disposed in the inner space of the casing 12 of the fuel cartridge 10, the power source (not shown) and the rotation drive source 22 are configured to be electrically connected to each other when the casing 12 of the fuel cartridge 10 is detachably connected to the aforementioned predetermined position on the outer surface of the outer housing OH of the fuel cell 14, as described above.

The fuel cartridge 10 is further provided with a fuel holding pack opening mechanism 24 which opens the fuel holding pack 16a corresponding to the connecting port 12a of the casing 12 and supplies the fuel in the fuel holding pack 16a to the fuel supply port 18 of the fuel cell 14.

The fuel holding pack opening mechanism 24 is configured to push the fuel holding pack 16a corresponding to the connecting port 12a of the casing 12 toward the fuel supply port 18 of the outer housing OH of the fuel cell 14 to open the same.

In the present embodiment, the fuel holding pack opening mechanism 24 includes a push member 24a which is disposed to correspond to the connecting port 12a in the internal space of the casing 12 and projects toward the outside of the casing 12. In more detail, the push member 24a is positioned in an inner side of the fuel holding pack belt 16 in the inner space of the casing 12 to correspond to the connecting port 12a.

A push member drive source 26 with a well known configuration is connected to the push member 24a. The push member drive source 26 can make the push member 24a project into or retract from the fuel supply port 18 of the outer housing OH of the fuel cell 14 through the connecting port 12a of the casing 12. The push member drive source 26 can be disposed in the inner space of the casing 12 or disposed near the aforementioned predetermined position on the outer surface of the outer housing OH of the fuel cell 14, as the aforementioned rotation drive source 22. The push member drive source 26 disposed near the aforementioned predetermined position on the outer surface of the outer housing OH of the fuel cell 14 is configured to detachably connect to the push member 24a when the casing 12 of the fuel cartridge 10 is detachably connected to the aforementioned predetermined position on the outer surface of the outer housing OH of the fuel cell 14.

Like the aforementioned power source (not shown) for the rotation drive source 22, a power source (not shown) for the push member drive source 26 can also be a battery disposed in the inner space of the casing 12 or a battery disposed in the fuel cell 14 or an external power source in the outside of the fuel cell 14.

In a case in which the power source (not shown) for the push member drive source 26 is disposed in the inner space of the casing 12 and the push member drive source 26 is disposed near the aforementioned predetermined position on the outer surface of the outer housing OH of the fuel cell 14, the power source (not shown) and the push member drive source 26 are configured to be electrically connected to each other when the casing 12 of the fuel cartridge 10 is detachably connected to the aforementioned predetermined position on the outer surface of the outer housing OH of the fuel cell 14.

To the contrary, even in a case in which the power source (not shown) for the push member drive source 26 is a battery disposed in the fuel cell 14 or an external power source in the outside of the fuel cell 14, and the push member drive source 26 is disposed in the inner space of the casing 12 of the fuel cartridge 10, the power source (not shown) and the push member drive source 26 are configured to be electrically connected to each other when the casing 12 of the fuel cartridge 10 is detachably connected to the aforementioned predetermined position on the outer surface of the outer housing OH of the fuel cell 14.

The rotation drive source 22 and the push member drive source 26 are connected to a controller 28 which controls operations of these sources, respectively. The controller 28 can be also disposed in the inner space of the casing 12 of the fuel cartridge 10 or can be disposed on or in the fuel cell 14. Therefore, in a case in which the controller 18 and the rotation drive source 22 and/or the push member drive source 26 are disposed separately in the casing 12 of the fuel cartridge 10 and on or in the fuel cell 14, they are configured to be connected to each other when the casing 12 of the fuel cartridge 10 is detachably connected to the aforementioned predetermined position on the outer surface of the outer housing OH of the fuel cell 14.

A well known fuel leakage detector 30 is disposed near the fuel supply port 18 in the outer housing OH of the fuel cell 14 or near the connecting port 12a in the casing 12 of the fuel cartridge 10. The fuel leakage detector 30 detects fuel leakage from the connection between the fuel supply port 18 in the outer surface of the outer housing OH of the fuel cell 14 and the connecting port 12a in the outer surface of the casing 12 of the fuel cartridge 10. The fuel leakage will occur when the aforementioned known sealing member or members (not shown) disposed around the fuel supply port 18 in the outer surface of the outer housing OH of the fuel cell 14, around the connecting port 12a in the outer surface of the casing 12 of the fuel cartridge 10, or around both of them is or are damaged.

Furthermore, a well known information reader 32 is disposed near the fuel supply port 18 in the outer housing OH of the fuel cell 14 or near the connecting port 12a in the casing 12 of the fuel cartridge 10. The information reader 32 reads information pieces recorded in the recording mediums 16b from the recording mediums 16b of the fuel holding pack belt 16 while the fuel holding pack belt 16 is conveyed by the fuel holding pack belt conveying mechanism 20 in the inner space of the casing 12.

A well known fuel cell condition detector 34 is disposed in the fuel cell 14 and detects various conditions of the fuel cell 14. The fuel cell condition detector 34 includes, for example, a fuel amount detector which measures a current amount of fuel in the fuel cell 14, a fuel concentration detector which measures the concentration of fuel currently used, a temperature detector which measures a temperature of heat currently generated by the electric power generation in the fuel cell 14, and the like.

The fuel leakage detector 30, the information reader 32, and the fuel cell condition detector 34 are also connected to the controller 28. Also in this case, when the fuel leakage detector 30, the information reader 32, the fuel cell condition detector 34, and the controller 28 are disposed separately in the casing 12 of the fuel cartridge 10 and on or in the fuel cell 14, they are configured to connect the fuel leakage detector 30, the information reader 32, and the fuel cell condition detector 34 to the controller 28 when the casing 12 of the fuel cartridge 10 is detachably connected to the aforementioned predetermined position on the outer surface of the outer housing OH of the fuel cell 14.

Next, with reference to FIG. 2A, FIG. 2B, FIG. 2C, and FIG. 2D, in the fuel cell 14 combined with the fuel cartridge 10 shown in FIG. 1A, how fuel is supplied to the fuel supply port 18 of the fuel cell 14 from the fuel holding pack 16a of the fuel holding pack belt 16 corresponding to the connecting port 12a of the casing 12 of the fuel cartridge 10 will be explained.

As shown in FIG. 2A in an enlarging manner, an outer portion of the fuel absorber FA disposed in the fuel supply port 18 of the fuel cell 14, the outer portion being adjacent to the entrance of the fuel supply port 18 in the outer housing OH, is made of a material having relatively large capillary force (for example, in a case of a porous material, a diameter of each pore is small), and an inner portion thereof adjacent to the fuel supply path 19 distant from the entrance of the fuel supply port 18 is made of a material having relatively small capillary force (for example, in a case of a porous material, a diameter of each pore is large). Further, a recess is formed in the outer portion of the fuel absorber FA and recessed toward the inner portion. In this embodiment, the recess is reduced in sectional area with separating from the entrance of the fuel supply port 18. Further, the shape and dimensions of the surface of the recess corresponds to those of the surface of an outer end portion of the push member 24a of the fuel holding pack opening mechanism 24, the outer end portion corresponding to the fuel supply port 18.

When a casing 12 of a new fuel cartridge 10 is connected to the predetermined position on the outer surface of the outer housing OH of the fuel cell 14 as shown in FIG. 1A, the controller 28 controls an operation of the rotation drive source 22 for the fuel holding pack belt conveying mechanism 20 and an operation of the push member drive source 26 for the fuel holding pack opening mechanism 24 in the fuel cartridge 10, on a basis of various information about a current condition of the fuel cell 14 from the fuel cell condition detector 34 and fuel leakage detection information from the fuel leakage detector 30.

For example, when the fuel leakage detector 30 does not detect fuel leakage and the fuel cell condition detector 34 does not detect a temperature of the fuel cell 14 beyond a predetermined range thereof, in particular, a predetermined value or more, and further detects that a current fuel amount of the fuel cell 14 is a predetermined value or less, the rotation drive source 22 is operated to cause the wind-up roller 20b to wind up the fuel holding pack belt 16.

In a case that the same kind of fuels are held in the plurality of fuel holding packs 16a of the fuel holding pack belt 16 in the casing 12 of the new fuel cartridge 10, the controller 28 stops the winding-up operation at a timing when a first fuel holding pack 16a of the fuel holding pack belt 16 reaches a position corresponding to the connecting port 12a of the casing 12 of the fuel cartridge 10, as shown in FIG. 2A.

In a case that plural kinds of fuels are held in the plurality of fuel holding pack 16a of the fuel holding pack belt 16 in the casing 12 of the new fuel cartridge 10, the controller 28 stops the winding-up operation at a timing when a fuel holding pack 16a holding a fuel whose kind is needed for causing the fuel cell 14 to operate with the utmost efficiency reaches a position corresponding to the connecting port 12a of the casing 12 of the fuel cartridge 10, on a basis of the current condition of the fuel cell 14 detected by the fuel cell condition detector 34 (for example, a concentration of the fuel currently used in the fuel cell 14 and/or a temperature of heat generated by the current electric power generation), as shown in FIG. 2A. During this time, the kinds of fuels held in the fuel holding packs 16a of the fuel holding pack belt 16 are read by the information reader 32 from the recording mediums 16b of the fuel holding pack belt 16 and transmitted to the controller 28.

After the winding-up operation is stopped, the push member 24a of the fuel holding pack opening mechanism 24 is driven by the push member drive source 26 to project into the fuel supply port 18 of the fuel cell 14 through the connecting port 12a of the casing 12. As a result, as shown in FIG. 2B, the fuel holding pack 16a corresponding to the connecting port 12a is pushed in the recess of the outer portion of the fuel absorber FA in the fuel supply port 18 by a projecting end portion of the push member 24a. Then, the fuel holding pack 16a is broken and opened by a stretching force loaded on the surface of the fuel holding pack 16a to cause the fuel held in the fuel holding pack 16a to flow into the recess of the outside portion of the fuel absorber FA.

The flowing-out fuel is firstly absorbed in some degree by the outer portion of the material having the relatively-large capillary force (for example, in a case of a porous material, a diameter of each pore is small) in the fuel absorber FA, and then immediately absorbed in the inner portion of the material having the relatively-small capillary force (for example, in a case of a porous material, a diameter of each pore is large) in the bottom of the recess of the fuel absorber FA. The fuel overflows into the fuel supply path 19 from the inner portion of the fuel absorber FA.

As shown in FIG. 2C, the push member 24a is projected into the fuel supply port 18 of the outer housing OH of the fuel cell 14 from the connecting port 12a of the casing 12 of the fuel cartridge 10 until the opened fuel holding pack 16a is pressed on the surface of the recess of the outer portion of the fuel absorber FA. Thereby, all fuel is pushed out from the opened fuel holding pack 16a to the outer portion of the material having the relatively-large capillary force (for example, in a case of a porous material, a diameter of each pore is small) in the fuel absorber FA, and then supplied in the fuel supply path 19 of the fuel cell 14 through the inner portion of the material having relatively-small capillary force (for example, in a case of a porous material, a diameter of each pore is large) in the fuel absorber FA.

The back portion of the opened fuel holding pack 16a and the projecting end portion of the push member 24a adjacent to the back portion in the recess of the outer portion of the fuel absorber FA function as a lid of the fuel supply port 18 to prevent the fuel from flowing back to the connecting port 12a from the fuel supply port 18.

During this time, when a fuel leakage to the outside from the aforementioned sealing member or sealing members (not shown) surrounding the connecting port 12a of the casing 12 of the fuel cartridge 10, the fuel supply port 18 of the outer housing OH of the fuel cell 14 or both of them is detected by the fuel leakage detector 30 (see FIG. 1A), the controller 28 controls the push member drive source 26 to retract the push member 24a into the connecting port 12a of the casing 12 of the fuel cartridge 10 as shown in FIG. 2D and to cause a well known alarming device (not shown) to generate alarm (including, for example, alarming display on a display device, lighting of an alarming light, generation of alarming sound from an alarming sound generator, or the like).

When the controller 28 determines that a current condition of the fuel cell 14 is abnormal (for example, a high temperature of the fuel cell 14 beyond a predetermined range of temperature) on a basis of information obtained from the fuel cell condition detector 34, the controller 28 can also cause the aforementioned known alarming device (not shown) to generate an alarm.

When the controller 28 determines that the current fuel amount of the fuel cell 14 becomes lower than or equal to a predetermined value on a basis of information obtained from the fuel cell condition detector 34, the controller 28 controls the push member drive source 26 to retract the push member 24a into the connecting port 12a of the casing 12 of the fuel cartridge 10 as shown in FIG. 2D and further control the rotation drive source 22 to operate the wind-up roller 20b to wind up the fuel holding pack belt 16.

In a case that the fuel holding packs 16a of the fuel holding pack belt 16 in the casing 12 of the new fuel cartridge 10 hold the same kind of fuels, the winding-up operation is stopped at a timing when the next fuel holding pack 16a of the fuel holding pack belt 16 to reach the position corresponding to the connecting port 12a of the casing 12, as shown in FIG. 2A.

In a case that plural kinds of fuels are held in the fuel holding packs 16a of the fuel holding pack belt 16 in the casing 12 of the new fuel cartridge 10, the winding-up operation is stopped at a timing when a fuel holding pack 16a holding a fuel whose kind is needed for causing the fuel cell 14 to operate with the utmost efficiency reaches the position corresponding to the connecting port 12a of the casing 12 as shown in FIG. 2A, on a basis of the current condition of the fuel cell 14 detected by the fuel cell condition detector 34 (for example, a concentration of a fuel currently used in the fuel cell 14 or a temperature of heat currently generated by the electric power generation). During this time, the kinds of fuels held by the fuel holding packs 16a of the fuel holding pack belt 16 are read by the information reader 32 from the recording mediums 16b of the fuel holding pack belt 16 and transmitted to the controller 28.

After the winding-up operation is stopped, the push member 24a of the fuel holding pack opening mechanism 24 is driven by the push member drive source 26 to project into the fuel supply port 18 of the outer housing OH of the fuel cell 14 through the connecting port 12a of the casing 12. As a result, as shown in FIG. 2B, the fuel holding pack 16a corresponding to the connecting port 12a is pushed into the recess of the outer portion of the fuel absorber FA of the fuel supply port 18 by the push member 24a. Then, the fuel holding pack 16a is broken and opened by a stretching force loaded on the surface of the fuel holding pack 16a, and the fuel held in the fuel holding pack 16a flows in the recess of the outer portion of the fuel absorber FA.

As shown in FIG. 2C, the push member 24a projects into the fuel supply port 18 from the connecting port 12a until the opened fuel holding pack 16a is pressed on the surface of the recess of the outer portion of the fuel absorber FA.

[First Modification]

Next, a first modification of the fuel cell 14 according to the first embodiment explained above with reference to FIG. 1A to FIG. 2D will be explained with reference to FIG. 3A and FIG. 3B.

Most part of structural members of a fuel cell 14a according to the first modification is the same as that of the fuel cell 14 according to the first embodiment. Therefore, in the fuel cell 14a according to the first modification, the same structural members as those of the fuel cell 14 according to the first embodiment are denoted by the same reference numerals which denoting the corresponding structural members in the fuel cell 14 according to the first embodiment, and detailed explanation for the same structural members are omitted.

The fuel cell 14a according to the first modification is different from the fuel cell 14 according to the first embodiment in that an opening and closing device 36 is provided between the fuel absorber FA and the fuel supply path 19 in the fuel supply port 18. In the first modification, the opening and closing device 36 is configured by an opening and closing valve.

The opening and closing device 36 is connected to the controller 28 shown in FIG. 1A. In a case that the controller 28 is disposed in the fuel cartridge 10, the opening and closing device 36 is connected to the controller 28 when the casing 12 of the fuel cartridge 10 is detachably connected to the aforementioned predetermined position on the outer surface of the outer housing OH of the fuel cell 14a.

The controller 28 closes the opening and closing device 36 in following cases, in one of which the casing 12 of the fuel cartridge 10 is not connected detachably to the aforementioned predetermined position on the outer surface of the outer housing OH of the fuel cell 14a, and in the other of which the fuel holding pack 16a to be opened next is not disposed at the position corresponding to the connecting port 12a of the casing 12 of the fuel cartridge 10 even after the casing 12 of the fuel cartridge 10 is detachably connected to the aforementioned predetermined position on the outer surface of the outer housing OH of the fuel cell 14a, as shown in FIG. 3A.

If the opening and closing device 36 is not provided, the fuel supply port 18 of the outer housing OH of the fuel cell 14a is opened in the above mentioned cases, so that foreign matters except for the fuel from the fuel holding pack 16a may enter the fuel supply path 19 of the fuel cell 14a through the opened fuel supply port 18. Therefore, the opening and closing device 36 reliably prevents foreign materials except for the fuel from the fuel holding pack 16a from entering the fuel supply path 19 of the fuel cell 14a through the fuel supply port 18 opened in the above cases.

The controller 28 opens the opening and closing device 36 in following cases, in one of which the casing 12 of the fuel cartridge 10 is connected detachably to the aforementioned predetermined position on the outer surface of the outer corresponding to OH of the fuel cell 14a, and in the other of which the fuel holding pack 16a to be opened next is disposed at the position corresponding to the connecting port 12a of the casing 12 of the fuel cartridge 10 after the casing 12 of the fuel cartridge 10 is detachably connected to the aforementioned predetermined position on the outer surface of the outer housing OH of the fuel cell 14a, as shown in FIG. 3B.

[Second Modification]

Next, a second modification of the fuel cell 14 according to the first embodiment explained above with reference to FIG. 1A to FIG. 2D will be explained with reference to FIG. 4A and FIG. 4B.

Most part of structural members of a fuel cell 14b according to the second modification is the same as that of the fuel cell 14 according to the first embodiment. Therefore, in the fuel cell 14b according to the second modification, the same structural members as those of the fuel cell 14 according to the first embodiment are denoted by the same reference numerals which denoting the corresponding structural members in the fuel cell 14 according to the first embodiment, and detailed explanation for the same structural members are omitted.

The fuel cell 14b according to the second modification is different from the fuel cell 14 according to the first embodiment in that an opening and closing device 38 is provided at an entrance of the fuel supply port 18 on the outer surface of the outer housing OH of the fuel cell 14b. In the second modification, the opening and closing device 38 is configured by opening and closing lids.

The opening and closing device 38 is connected to the controller 28 shown in FIG. 1A. In a case that the controller 28 is disposed in the fuel cartridge 10, the opening and closing device 38 is connected to the controller 28 when the casing 12 of the fuel cartridge 10 is detachably connected to the aforementioned predetermined position on the outer surface of the outer housing OH of the fuel cell 14a.

The controller 28 closes the opening and closing device 38 in following cases: in one of which the casing 12 of the fuel cartridge 10 is not connected detachably to the aforementioned predetermined position on the outer surface of the outer housing OH of the fuel cell 14a, and in the other of which the fuel holding pack 16a to be opened next is not disposed at the position corresponding to the connecting port 12a of the casing 12 of the fuel cartridge 10 even after the casing 12 of the fuel cartridge 10 is detachably connected to the aforementioned predetermined position on the outer surface of the outer housing OH of the fuel cell 14a, as shown in FIG. 4A.

If the opening and closing device 38 is not provided, the fuel supply port 18 of the outer housing OH of the fuel cell 14a is opened in the above mentioned cases, so that foreign materials except for the fuel from the fuel holding pack 16a may enter the fuel supply path 19 of the fuel cell 14a through the opened fuel supply port 18. Therefore, the opening and closing device 38 reliably prevents foreign materials except for the fuel from the fuel holding pack 16a from entering the fuel supply path 19 of the fuel cell 14a through the fuel supply port 18 opened in the above cases.

The controller 28 opens the opening and closing device 38 in following cases, in one of which the casing 12 of the fuel cartridge 10 is connected detachably to the aforementioned predetermined position on the outer surface of the outer housing OH of the fuel cell 14a, and in the other of which the fuel holding pack 16a to be opened next is disposed at the position corresponding to the connecting port 12a of the casing 12 of the fuel cartridge 10 even after the casing 12 of the fuel cartridge 10 is detachably connected to the aforementioned predetermined position on the outer surface of the outer housing OH of the fuel cell 14a, as shown in FIG. 4B.

[Third Modification]

Next, a third modification of the fuel cell 14 according to the first embodiment explained above with reference to FIG. 1A to FIG. 2D will be explained with reference to FIG. 5A, FIG. 5B, and FIG. 5C.

Most part of structural members of a fuel cell 14c according to the third modification is the same as that of the fuel cell 14 according to the first embodiment. Therefore, in the fuel cell 14c according to the third modification, the same structural members as those of the fuel cell 14 according to the first embodiment are denoted by the same reference numerals which denoting the corresponding structural members in the fuel cell 14 according to the first embodiment, and detailed explanation for the same structural members are omitted.

The fuel cell 14c according to the third modification is different from the fuel cell 14 according to the first embodiment in that the fuel cell 14c is provided with a fuel holding pack breaking and opening member 40 projecting toward the entrance of the fuel supply port 18 in the fuel supply port 18 of the outer housing OH of the fuel cell 14c. In the third modification, the fuel holding pack breaking and opening member 40 includes a base end portion fixed on a part of the inner portion of the fuel absorber FA in the fuel supply port 18 and an acute projecting end portion disposed in the recess of the outer portion of the fuel absorber FA and projecting toward the entrance of the fuel supply port 18.

An end face of the outer end portion facing the connecting port 12a of the casing 12 in the push member 24a of the fuel holding pack opening mechanism 24 for the fuel cartridge 10 used in combination with the fuel cell 14c according to the third modification is not acuter than that of the outer end portion of the push member 24a of the fuel holding pack opening mechanism 24 for the fuel cartridge 10 according to the first embodiment, the push member 24a of the first embodiment acting on the fuel supply port 18 of the fuel cell 14 according to the first embodiment in which the fuel holding pack breaking and opening member 40 such as shown in FIG. 5A, FIG. 5B, and FIG. 5C is not provided in the fuel supply port 18 as shown in FIG. 1A to FIG. 2D.

When the push member 24a of the fuel holding pack opening mechanism 24 for the fuel cartridge 10 used in combination with the fuel cell 14c according to the third modification is driven by the push member drive source 26 and pushes the fuel holding pack 16a to be opened which is disposed at the position corresponding to the connecting port 12a of the casing 12 of the fuel cartridge 10 as shown in FIG. 5A into the fuel supply port 18, the projected fuel holding pack 16a is pushed by the push member 24a to the acute outer end portion of the fuel holding pack breaking and opening member 40 in the fuel supply port 18. The pushed fuel holding pack 16a is broken and opened as shown in FIG. 5B. The fuel flowing out from the opened fuel holding pack 16a into the fuel supply port 18 is immediately absorbed by the fuel absorber FA in the fuel supply port 18 and further flows into the fuel supply path 19 of the fuel cell 14c.

When the push member 24a of the fuel holding pack opening mechanism 24 is driven by the push member drive source 26 and retracted into the connecting port 12a of the casing 12 of the fuel cartridge 10 from the fuel supply port 18 of the fuel cell 14, the opened fuel holding pack 16a is separated toward the entrance of the fuel supply port 18 from the acute outer end portion of the fuel holding pack breaking and opening member 40 in the fuel supply port 18, as shown in FIG. 5C. Thereafter, the fuel holding pack belt 16 is wound up by the wind-up roller 20b of the fuel holding pack belt conveying mechanism 20 of the fuel cartridge 10, so that the opened fuel holding pack 16a is moved from the fuel supply port 18 of the fuel cell 14 and the position corresponding to the connecting port 12a of the casing 12 of the fuel cartridge 10.

The fuel holding pack braking and opening member 40 in the fuel supply port 18 ensures opening of the fuel holding pack 16a by the push member 24a of the fuel holding pack opening mechanism 24 in the fuel supply port 18.

Second Embodiment

Next, a fuel cartridge 10a for a fuel cell according to a second embodiment of the present invention and a fuel cell 14d according to the second embodiment of the present invention used in combination with the fuel cartridge 10a will be explained with reference to FIG. 6A to FIG. 6D.

Most part of structural members of each of the fuel cartridge 10a and the fuel cell 14d, both of which are according to the second embodiments, is the same as that of the fuel cartridge 10 and the fuel cell 14, both of which are according to the first embodiments described above with reference to FIG. 1A to FIG. 2D. Therefore, in each of the fuel cartridge 10a and the fuel cell 14d, both of which are according to the second embodiments, the same structural members as those of each of the fuel cartridge 10 and the fuel cell 14, both of which are according to the first embodiment, are denoted by the same reference numerals which denoting the corresponding structural members in each of the fuel cartridge 10 and the fuel cell 14 according to the first embodiment, and detailed explanation for the same structural members are omitted.

The fuel cartridge 10a according to the second embodiment is different from the fuel cartridge 10 according to the first embodiment in that one guide roller 20'c in a plurality of guide rollers 20c of the fuel holding pack belt conveying mechanism 20 functions as a push member of a fuel holding pack opening mechanism 24', the one guide roller 20'c being positioned adjacent to and in a downstream side of the connecting port 12a in the conveying direction of the fuel holding pack belt 16.

The guide roller 20'c in the second embodiment is configured to move reciprocally along the conveying direction of the fuel holding pack belt 16 between a predetermined initial position, at which the guide roller 20'c is positioned adjacent to and in the downstream side of the connecting port 12a in the conveying direction of the fuel holding pack belt 16, and a rear end position, at which the guide roller 20'c is positioned near the guide roller 20c located adjacent to and in the upstream side of the connecting port 12a in the conveying direction. Further, the guide roller 20'c moves from the connecting port 12a of the casing 12 of the fuel cartridge 10a into the fuel supply port 18 of the outer housing OH of the fuel cell 14d between just after leaving the predetermined initial position and just before reaching the rear end position, and moves along the connecting port 12a in a state that the guide roller 20'c are retracted in the casing 12 of the fuel cartridge 10a while returning from the rear end position to the initial position.

Such movements of the guide roller 20'c are performed by the push member drive source 26 controlled by the controller 28 shown in FIG. 1A.

Further, a fuel absorber FA' provided in the fuel supply port 18 of the fuel cell 14d according to the second embodiment is different in configuration from the fuel absorber FA of the fuel cell 14 according to the first embodiment. Specifically, the fuel absorber FA' is provided with a first layer S1, a second layer S2, a third layer S3, and a fourth layer S4. The first layer S1 is disposed at an inner end portion adjacent to the fuel supply path 19 in the fuel supply port 18 and made from a material having relatively small capillary force (for example, in a case of a porous material, a diameter of each pore is large). The second layer S2 is disposed adjacent to the first layer S1 on a side thereof near the connecting port 12a of the casing 12 of the fuel cartridge 10a in the fuel supply port 18 and made from a hard porous material. The third layer S3 is disposed adjacent to the second layer S2 on a side thereof near the connecting port 12a of the casing 12 of the fuel cartridge 10a in the fuel supply port 18 and made from a material having elasticity and relatively small capillary force (for example, in a case of a porous material, a diameter of each pore is large). And, the fourth layer S4 is disposed adjacent to the third layer S3 in an outer end portion adjacent to the connecting port 12a of the casing 12 of the fuel cartridge 10a in the fuel supply port 18 and made from a hard porous material.

Here, the first layer S1 and the second layer S2 in the inner end portion side of the fuel supply port 18 are fixed on the surface of the fuel supply port 18, while the third layer S3 and the fourth layer S4 in the outer end portion side of the fuel supply port 18 are movable in a direction along a center line of the fuel supply port 18 along the surface of the fuel supply port 18. The third layer S3 and the fourth layer S4 are held in the outer end portion of the fuel supply port 18 so as not to drop out from the entrance of the fuel supply port 18. For example, an annular portion of the surface of the fuel supply port 18 which corresponds to the outer peripheral surface of the third layer S3 is formed to have a diameter larger than other portion of the surface of the fuel supply port 18, and the outer peripheral surface of the third layer S3 enters in the circular portion so that the third layer S3 is prevented from dropping out from the entrance of the fuel supply port 18. And, the fourth layer S4 is fixed on the third layer S3 so that the fourth layer S4 is prevented from dropping out from the entrance of the fuel supply port 18 with the third layer S3.

In the fuel cartridge 10a and the fuel cell 14d both of which are according to the second embodiment, when a fuel holding pack 16a to be opened is disposed to correspond to the connecting port 12a of the casing 12 of the fuel cartridge 10a as shown in FIG. 6A, the one guide roller 20'c of the plurality of guide rollers 20c of the fuel holding pack belt conveying mechanism 20 is moved to start from the predetermined initial position shown in FIG. 6A by the push member drive source 26 controlled by the controller 28 in FIG. 1A. At the initial position, the one guide roller 20'c is positioned adjacent to and in the downstream side of the connecting port 12a in the conveying direction of the fuel holding pack belt 16.

First, the guide roller 20'c is moved toward the connecting port 12a and toward the fuel supply port 18 of the fuel cell 14 from the connecting port 12a and projected into the fuel supply port 18.

Figure 6B:
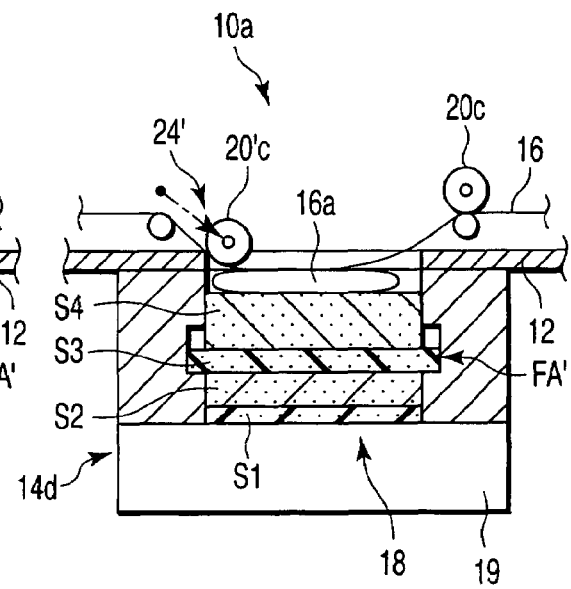

The guide roller 20'c moving as described above pushes the fuel holding pack 16a positioned corresponding to the connecting port 12a onto the outer surface of the fourth layer S4 of the fuel absorber FA' in the fuel supply port 18 so that the third layer S3 of the fuel absorber FA' is compressed, as shown in FIG. 6B. As a result, the fuel holding pack 16a on the outer surface of the fourth layer S4 of the fuel absorber FA' is pinched by the pushing force of the guide roller 20'c and the reaction force generated in the third layer S3 by the compression.

Figure 6C:
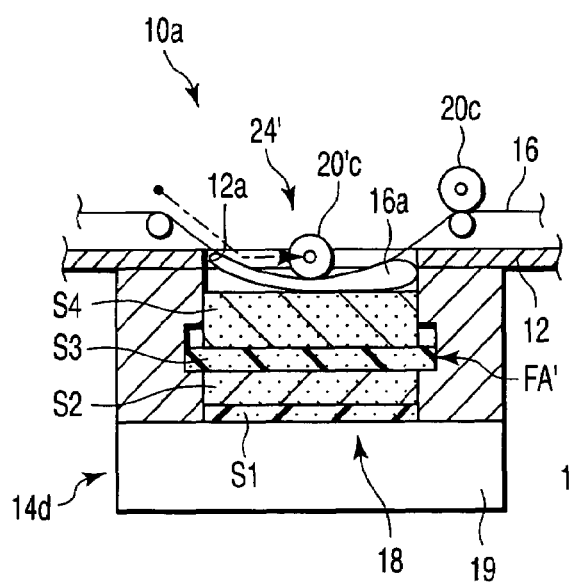

Next, as shown in FIG. 6C, the guide roller 20'c is moved toward the upstream side in the conveying direction of the fuel holding pack belt 16 in the connecting port 12a in a state that the guide roller 20'c is projected into the fuel supply port 18 as described above. The guide roller 20'c moved as described above breaks and opens the fuel holding pack 16a on the outer surface of the fourth layer S4 of the fuel absorber FA' in the fuel supply port 18. The guide roller 20'c moved as described above cooperates with the reaction force generated in the compressed third layer S3 to squeeze out the fuel from the opened fuel holding pack 16a onto the outer surface of the fourth layer S4 of the fuel absorber FA'. The squeezed-out fuel sequentially passes through the fourth layer S4, the third layer S3, the second layer S2, and the first layer S1 of the fuel absorber FA' in the fuel supply port 18, and finally reaches the fuel supply path 19.

Figure 6D:
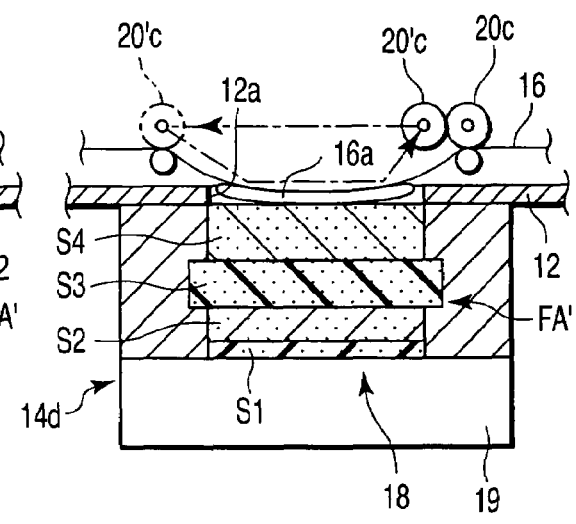

The guide roller 20'c which reaches the upstream end of the connecting port 12a in the conveying direction of the fuel holding pack belt 16 is pulled up toward the inside of the connecting port 12a from the fuel supply port 18 and reaches the rear end position. At the rear end position, the guide roller 20'c is positioned near the guide roller 20c adjacent to the connecting port 12a in the upstream side thereof in the conveying direction of the fuel holding pack belt 16, as shown in FIG. 6D. By such movement of the guide roller 20'c, the third layer S3 of the fuel absorber FA' expands toward the fuel supply port 18 due to its own elastic force to push out the opened fuel holding pack 16a on the outer surface of the fourth layer S4 of the fuel absorber FA' from the entrance of the fuel supply port 18.

Thereafter, the guide roller 20'c moves from the rear end position shown in FIG. 6D to the initial portion shown in FIG. 6A along the connecting port 12a in a state that the guide roller 20'c is retracted into the casing 12 of the fuel cartridge 10a.

After the guide roller 20'c returns to the initial position, the fuel holding pack belt 16 is wound up by the wind-up roller 20b of the fuel holding pack belt conveying mechanism 20 so that the opened fuel holding pack 16a is moved from the fuel supply port 18 of the fuel cell 14 and the position corresponding to the connecting portion 12a of the casing 12 of the fuel cartridge 10 to the downstream side of the connecting portion 12a in the conveying direction of the fuel holding pack belt 16.

A Modification of the Second Embodiment

Next, with reference to FIG. 7A to FIG. 7D, the fuel cartridge 10a for a fuel cell according to the second embodiment and a fuel cell 14e according to a modification of the second embodiment and used in combination with the fuel cartridge 10a according to the second embodiment will be explained.

Most part of structural members of the fuel cell 14e according to the modification of the second embodiment is the same as that of the fuel cell 14d according to the second embodiment described above with reference to FIG. 6A to FIG. 6D. Therefore, in the fuel cell 14e according to the modification of the second embodiment, the same structural members as those of the fuel cell 14d according to the second embodiment are denoted by the same reference numerals which denoting the corresponding structural members in the fuel cell 14d according to the second embodiment, and detailed explanation for the same structural members are omitted.

The fuel cell 14e according to the modification of the second embodiment is different from the fuel cell 14d according to the second embodiment in that a fuel holding pack breaking and opening member 42 is further fixed on the outer surface of the fourth layer S4 of the fuel absorber FA'. The fuel holding pack breaking and opening member 42 is made from a material which is harder than the fuel holding pack 16a and unchanged in properties by the fuel held in the fuel holding pack 16a, and has a plurality of teeth projecting toward the entrance of the fuel supply port 18.

In the fuel cartridge 10a according to the second embodiment and the fuel cell 14e according to the modification of the second embodiment, when the fuel holding pack 16a to be opened is positioned at a position corresponding to the connecting port 12a of the casing 12 of the fuel cartridge 10a as show in FIG. 7A, one guide roller 20'c of the plurality of guide rollers 20c of the fuel holding pack belt conveying mechanism 20 is moved to start from a predetermined initial position shown in FIG. 7A by the push member drive source 26 controlled by the controller 28 shown in FIG. 1A, the initial position being adjacent to the connecting port 12a in the downstream side of the connecting port 12a in the conveying direction of the fuel holding pack belt 16.

First, the guide roller 20'c is moved toward the connecting port 12a and toward the fuel supply port 18 of the fuel cell 14 from the connecting port 12a to project into the fuel supply port 18.

As shown in FIG. 7B, the guide roller 20'c moved as described above pushes the fuel holding pack 16a corresponding to the connecting port 12a onto the fuel holding pack breaking and opening member 42 on the outer surface of the fourth layer S4 of the fuel absorber FA' in the fuel supply port 18 to break the same. The third layer S3 of the fuel absorber FA' is compressed, and the fuel holding pack 16a on the outer surface of the fourth layer S4 of the fuel absorber FA' is pinched by the pushing force of the guide roller 20'c and a reaction force generated in the third layer S3 by the compression.

Next, as shown in FIG. 7C, the guide roller 20'c is moved toward the upstream end of the connecting port 12a in the conveying direction of the fuel holding pack belt 16 in a state that the guide roller 20'c is projected into the fuel supply port 18 as described above. The guide roller 20'c moved as described above cooperates with the reaction force generated in the third layer S3 to press the fuel holding pack 16a broken and opened by the fuel holding pack breaking and opening member 42 so that the fuel is squeezed out from the broken and opened fuel holding pack 16a on the outer surface of the fourth layer S4 of the fuel absorber FA'. The squeezed-out fuel sequentially passes through the fourth layer S4, the third layer S3, the second layer S2, and the first layer S1 of the fuel absorber FA' in the fuel supply port 18 and finally reaches the fuel supply path 19.

The guide roller 20'c which reached the upstream end of the connecting port 12a in the conveying direction of the fuel holding pack belt 16 is pulled up toward the inside of the connecting port 12a from the fuel supply port 18 as shown in FIG. 7D and reaches the rear end position near the guide roller 20c adjacent to connecting port 12a in the upstream side of the connecting port 12a in the conveying direction of the fuel holding pack belt 16. By such movement of the guide roller 20'c, the third layer S3 of the fuel absorber FA' expands toward the fuel supply port 18 due to its own elastic force and pushes out the opened fuel holding pack 16a on the fuel holding pack breaking and opening member 42 on the outer surface of the fourth layer S4 of the fuel absorber FA' from the entrance of the fuel supply port 18.

Thereafter, the guide roller 20'c moves along the connecting port 12a from the rear end position shown in FIG. 7D to the initial portion shown in FIG. 7A in a state that the guide roller 20'c is retracted into the casing 12 of the fuel cartridge 10a.

After the guide roller 20'c returns to the initial position, the fuel holding pack belt 16 is wound up by the wind-up roller 20b of the fuel holding pack belt conveying mechanism 20 so that the opened fuel holding pack 16a is separated from the fuel holding pack breaking and opening member 42 on the outer surface of the fourth layer S4 of the fuel absorber FA' and further moved from the fuel supply port 18 of the fuel cell 14 and the position corresponding to the connecting portion 12a of the casing 12 of the fuel cartridge 10 to the downstream side of the connecting portion 12a in the conveying direction of the fuel holding pack belt 16.

Third Embodiment

Next, a fuel cartridge 10'a for a fuel cell according to a third embodiment of the present invention and the fuel cell 14d according to the second embodiment used in combination with the fuel cartridge 10'a will be explained with reference to FIG. 8A, FIG. 8B, and FIG. 8C.

Most part of structural members of the fuel cartridge 10'a according to the third embodiment is the same as that of the fuel cartridge 10 according to the first embodiment described above with reference to FIG. 1A. Therefore, in the fuel cartridge 10'a according to the third embodiment, the same structural members as those of the fuel cartridge 10 according to the first embodiment are denoted by the same reference numerals which denoting the corresponding structural members in the fuel cartridge 10 according to the first embodiment, and detailed explanation for the same structural members are omitted.

The fuel cartridge 10'a according to the third embodiment is different from the fuel cartridge 10 according to the first embodiment in a surface shape of the projecting end portion of a push member 24"a of the fuel holding pack opening mechanism 24", the projecting end portion facing the connecting portion 12a of the casing 12 of the fuel cartridge 10'a. The projecting end portion of the push member 24"a has a curved surface having a curvature larger than that of the surface of the projecting end portion of the push member 24a of the fuel holding pack opening mechanism 24 according to the first embodiment, the projecting end portion also facing the connecting port 12a of the casing 12 of the fuel cartridge 10. The push member 24"a of the third embodiment has a columnar shape extending in a direction perpendicular to the conveying direction of the fuel holding pack belt 16' along the surface of the fuel holding pack belt 16', and is longer than the dimension of the fuel holding pack belt 16' in the direction (widthwise direction) perpendicular to the conveying direction.

Further, the fuel holding pack belt 16' includes a plurality of hollow fuel holding chambers in the inside thereof, and the hollow fuel holding chambers are separated from one another at predetermined intervals in the conveying direction of the fuel holding pack belt 16' provide a plurality of fuel holding packs 16'a.

Each of the plurality of hollow fuel holding chambers has a portion which is thinner and lower in strength than other portion on its surface facing the connecting port 12a when each of the hollow fuel holding chambers corresponds to the connecting port 12a of the casing 12 of the fuel cartridge 10'a.

Figures 8A, 8B:
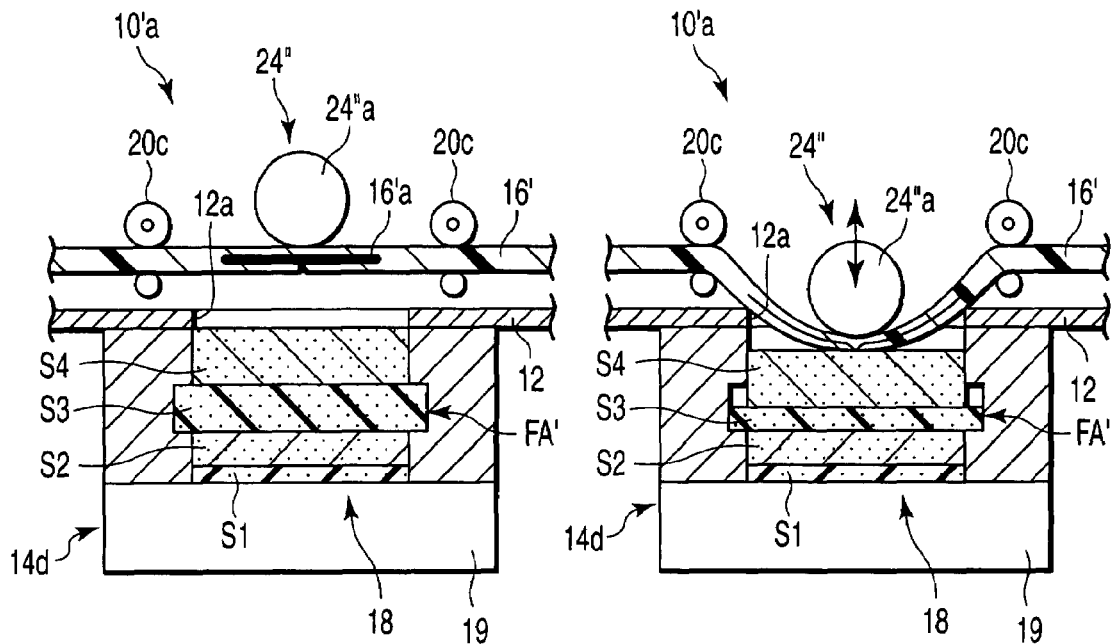
FIG. 8A, FIG. 8B and FIG. 8C are schematic vertical sectional views sequentially showing, in a combination of a fuel cartridge for a fuel cell according to a third embodiment of the present invention and the fuel cell according to the second embodiment of the present invention, how a push member of a fuel holding pack opening mechanism of the fuel cartridge pushes a fuel holding pack of a fuel holding pack belt of the fuel cartridge toward the fuel supply port of the fuel cell through a connecting port of a casing of the fuel cartridge and opens the fuel holding pack to supply fuel from the opened fuel holding pack to the fuel supply port.

In a combination of the fuel cartridge 10'a according to the third embodiment with the fuel cell 14d according to the second embodiment, when the fuel holding pack 16'a to be opened is positioned to correspond to the connecting port 12a of the casing 12 of the fuel cartridge 10'a as shown in FIG. 8A, the push member 24"a of the fuel holding pack opening mechanism 24" is moved by the push member drive source 26 controlled by the controller 28 shown in FIG. 1A toward the fuel supply port 18 of the fuel cell 14d from a predetermined initial position corresponding to the port 12a shown in FIG. 8A, so that the push member 24"a projects into the fuel supply port 18.

As shown in FIG. 8B, the push member 24"a moved as described above pushes the fuel holding pack 16' corresponding to the connecting port 12a onto the outer surface of the fourth layer S4 of the fuel absorber FA' in the fuel supply port 18 so that the third layer S3 of the fuel absorber FA' is compressed. As a result, the fuel holding pack 16'a on the outer surface of the fourth layer S4 of the fuel absorber FA' is pinched by the pushing force of the push member 24"a and a reaction force generated in the third layer S3 by the compression.

An Internal pressure of the fuel in the fuel holding pack 16'a increases due to the compression, so that the aforementioned portion which is low in strength of the fuel holding pack 16'a is broken and opened. As a result, the fuel is squeezed out from the opened fuel holding pack 16'a onto the outer surface of the fourth layer S4 of the fuel absorber FA' by the pushing force from the push member 24"a and the reaction force from the third layer S3. The squeezed-out fuel sequentially passes through the fourth layer S4, the third layer S3, the second layer S2, and the first layer S1 of the fuel absorber FA' in the fuel supply port 18, and finally reaches the fuel supply path 19.

Figure 8C:
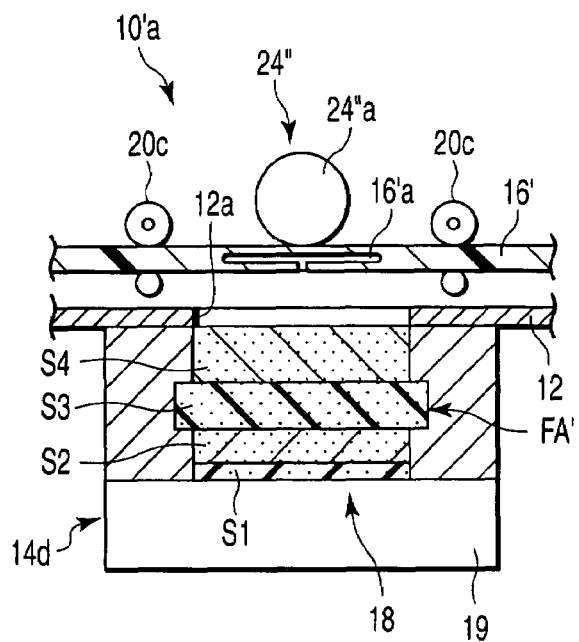

Next, as shown in FIG. 8C, the push member 24"a is pulled up into the connecting port 12a from the fuel supply port 18. With this movement of the push member 24"a, the third layer S3 of the fuel absorber FA' expands toward the fuel supply port 18 due to its own elastic force so that the fuel holding pack 16'a on the outer surface of the fourth layer S4 of the fuel absorber FA' is pushed out from the entrance of the fuel supply port 18.

Thereafter, the fuel holding pack belt 16' is wound up by the wind-up roller 20b of the fuel holding pack belt conveying mechanism 20 so that the opened fuel holding pack 16'a is moved from the inside of the fuel supply port 18 of the fuel cell 14d and the position corresponding to the connecting port 12a of the casing 12 of the fuel cartridge 10'a to the downstream side of the connecting port 12a of the casing 12 of the fuel cartridge 10'a in the conveying direction of the fuel holding pack belt 16'.

Fourth Embodiment

Next, a fuel cartridge 50 for a fuel cell according to a fourth embodiment of the present invention and the fuel cell 14 according to the first embodiment of the present invention used in combination with the fuel cartridge 50 according to the fourth embodiment will be explained with reference to FIG. 9.

Most part of structural members of the fuel cartridge 50 according to the fourth embodiment is the same as that of the fuel cartridge 10 according to the first embodiment described above with reference to FIG. 1A. Therefore, in the fuel cartridge 50 according to the fourth embodiment, the same structural members as those of the fuel cartridge 10 according to the first embodiment are denoted by the same reference numerals which denoting the corresponding structural members in the fuel cartridge 10 according to the first embodiment, and detailed explanation for the same structural members are omitted.

The fuel cartridge 50 of the fourth embodiment houses one more fuel holding pack belt 16" in a casing 12'. Fuels which are different in kind from the fuels held by the fuel holding packs 16a of the fuel holding pack belt 16 or fuels which are the same kind as that of the fuels held by the fuel holding packs 16a of the fuel holding pack belt 16 can be held by the fuel holding packs 16"a of the one more fuel holding pack belt 16". The size of each fuel holding pack 16"a of the one more fuel holding pack belt 16" may be different from that of each fuel holding pack 16a of the fuel holding pack belt 16 or may be the same.

The fuel cartridge 50 of the fourth embodiment further houses one more fuel holding pack belt conveying mechanism 20' for conveying the above described one more fuel holding pack belt 16" in the casing 12'. The one more fuel holding pack belt conveying mechanism 20' conveys the one more fuel holding pack belt 16" in a predetermined direction in which the fuel holding packs 16"a of the one more fuel holding pack belt 16" are arranged so that the fuel holding packs 16"a pass over the connecting port 12a of the casing 12', as in the case of the fuel holding pack belt conveying mechanism 20 for conveying the fuel holding pack belt 16. The one more fuel holding pack belt conveying mechanism 20' includes a pair of supply roller 20'a and wind-up roller 20'b, like the fuel holding pack belt conveying mechanism 20 for conveying the fuel holding pack belt 16. The wind-up roller 20'b of the one more fuel holding pack belt conveying mechanism 20' is connected to one more rotation drive source 22' controlled by the controller 28, like that the wind-up roller 20b of the fuel holding pack belt conveying mechanism 20 is connected to the rotation drive source 22 controller by the controller 28.

The fuel holding pack belt 16" is also long and narrow in the predetermined direction, and one end portion thereof positioned in the predetermined direction is fixed to the wind-up roller 20'b while the other end portion thereof positioned in a direction opposite to the predetermined direction is fixed to the supply roller 20'a.

The fuel holding pack belt conveying mechanism 20' further includes a plurality of guide rollers 20c. These guide rollers 20c guide an intermediate portion of the fuel holding pack belt 16" extending between the pair of the supply roller 20'a and the wind-up roller 20'b in the casing 12' so that the intermediate portion passes over the connecting port 12a of the casing 12.

Figure 9:
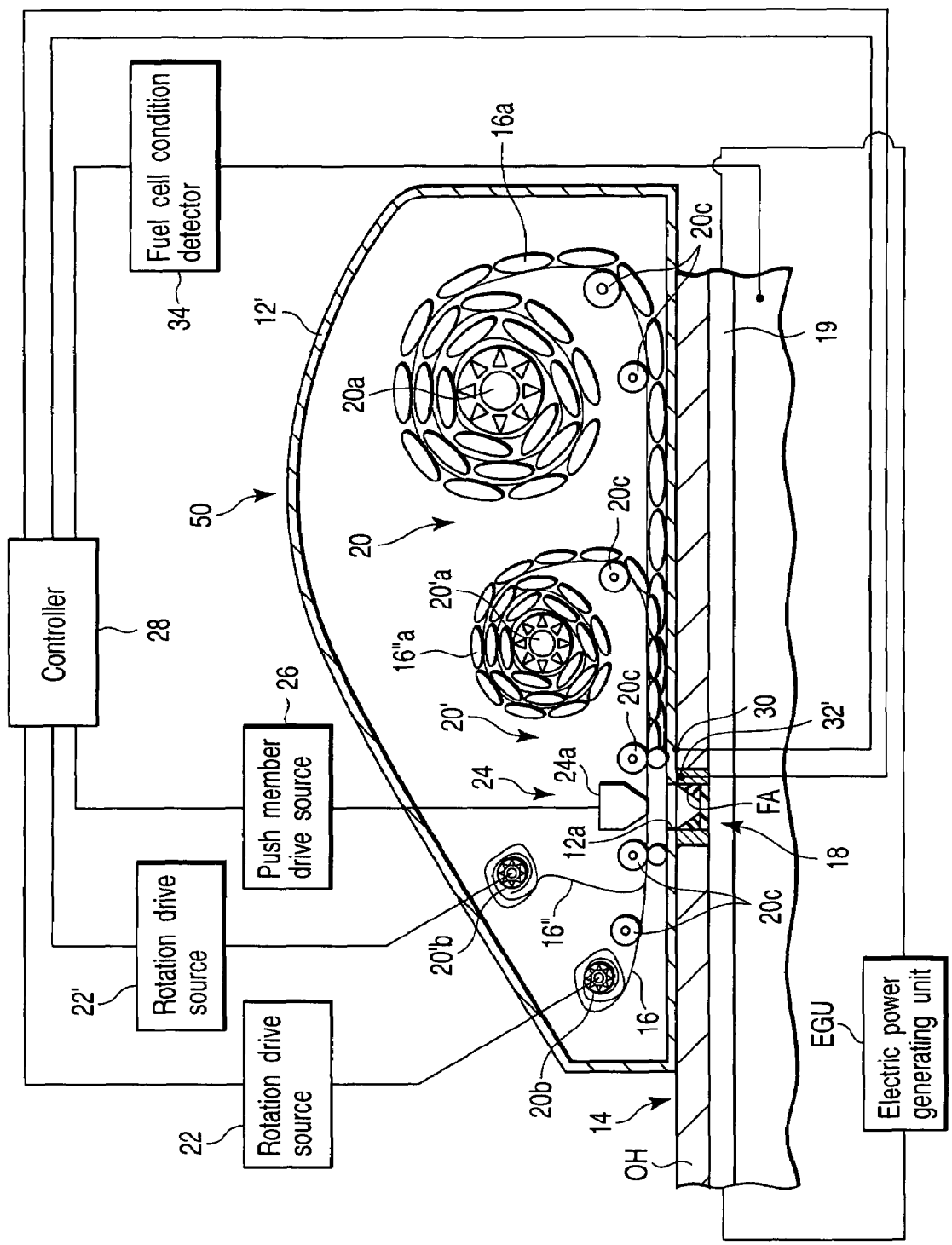
FIG. 9 is a vertical sectional view schematically showing a state in which a casing of a fuel cartridge for a fuel cell according to a fourth embodiment of the present invention is detachably connected to the predetermined position of the fuel cell according to the first embodiment of the present invention.

In a new fuel cartridge 50, as shown in FIG. 9, only the one end portion of the fuel holding pack belt 16" is fixed to the wind-up roller 20'b while the intermediate portion of the fuel holding pack belt 16" is not wound up by the wind-up roller 20'b, and the intermediate portion is wound up on the feed roller 20'a except for a portion thereof extending from the wind-up roller 20'b to a position near the supply roller 20'a through the plurality of guide rollers 20c. In this initial state, the fuel holding packs 16"a are disposed in a range from a position just before the connecting port 12a to the other end portion fixed to the feed roller 20'a on the intermediate portion of the fuel holding pack belt 16".

A rotation force is transmitted from the rotation drive source 22' such as a motor to the wind-up roller 20'b of the fuel holding pack belt conveying mechanism 20'. The rotation drive source 22' can be disposed in an inner space of the casing 12' or can be disposed near the aforementioned predetermined position on the outer surface of the outer housing OH of the fuel cell 14. In a case that the rotation drive source 22' is disposed near the aforementioned predetermined position on the outer surface of the outer housing OH of the fuel cell 14, the rotation drive source 22' is configured to detachably connect to the wind-up roller 20'b when the casing 12' of the fuel cartridge 50 is detachably connected to the aforementioned predetermined position on the outer surface of the outer housing OH of the fuel cell 14 as described above.

A power source (not shown) for the rotation drive source 22' can also be a battery disposed in the inner space of the casing 12', or can be a battery disposed in the fuel cell 14 or an external power source outside the fuel cell 14.

In a case that the power source (not shown) is disposed in the inner space of the casing 12' and the rotation drive source 22" is disposed near the aforementioned predetermined position on the outer surface of the outer housing OH, the power source (not shown) and the rotation drive source 22" are configured to electrically connected to one another when the casing 12' of the fuel cartridge 50 is detachably connected to the aforementioned predetermined position on the outer surface of the outer housing OH of the fuel cell 14 as described above. To the contrary, in a case that the power source (not shown) is disposed in the fuel cell 14 or the power source (not shown) is the external power source outside the fuel cell 14 and the rotation drive source 22' is disposed in the inner space of the casing 12' of the fuel cartridge 50, the power source (not shown) and the rotation drive source 22" are configured to electrically connected to one another when the casing 12' of the fuel cartridge 50 is detachably connected to the aforementioned predetermined position on the outer surface of the outer housing OH of the fuel cell 14 as described above.

The rotation drive source 22' is also connected to the controller 28 so that the controller 28 can control the operation of the rotation drive source 22'. In a case that the controller 28 and the rotation drive source 22' are disposed separately in the casing 12' of the fuel cartridge 50 and the fuel cell 14, the controller 28 and the rotation drive source 22' are configured to connect to each other when the casing 12' of the fuel cartridge 50 is detachably connected to the aforementioned predetermined position on the outer surface of the outer housing OH of the fuel cell 14 as described above.

The push member 24a of the fuel holding pack opening mechanism 24 for the fuel cartridge 50 can push the fuel holding packs 16a and 16"a corresponding to the connecting port 12a of the casing 12' in the two fuel holding pack belts 16 and 16" toward the fuel supply port 18 of the fuel cell 14 and open these packs 16a and 16"a so that the fuels in the two fuel holding packs 16a and 16"a are supplied into the fuel supply port 18 of the fuel cell 14.

A recording medium which records various information on the kind of fuels in the fuel holding packs 16"a can be disposed on the fuel holding pack belt 16", and a reader 32' can read various information recorded not only in the recording mediums 16b of the fuel holding pack belt 16 but also in the recording mediums of the fuel holding pack belt 16".

In this embodiment, the two fuel holding pack belt conveying mechanisms 20 and 20' can be individually driven to cause the fuel holding packs 16a and 16" a to correspond to the connecting port 12a of the casing 12' individually. This means that, after a combination of desired one of the fuel holding packs 16a of the fuel holding pack belt 16 and desired one of the fuel holding packs 16"a of the one more fuel holding pack belt 16" is positioned to correspond to the connecting port 12a of the casing 12', the push member 24a of the fuel holding pack opening mechanism 24 can push the combination of the desired fuel holding packs 16a and 16" a corresponding to the connecting port 12a of the casing 12' in the two fuel holding pack belts 16 and 16" toward the fuel supply port 18 of the fuel cell 14 and open the combination so that the fuels in the two desired fuel holding packs 16*a* and 16" a are supplied to the fuel supply port 18 of the fuel cell 14.

[Modifications of Fuel Holding Pack Belt]

Figure 10A:
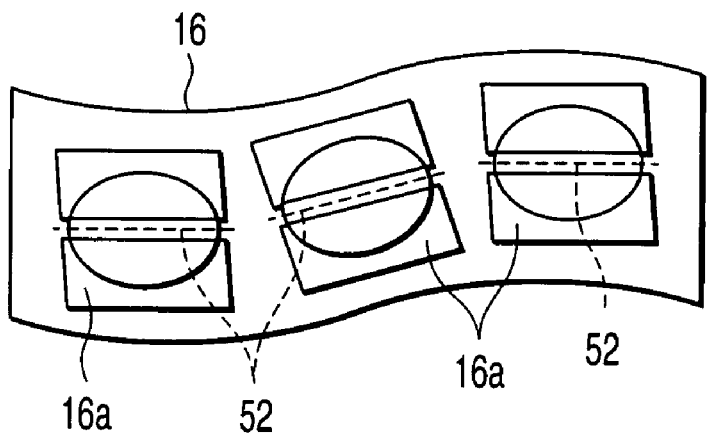
FIG. 10A, FIG. 10B, and FIG. 10C are plan views schematically showing various modifications of a fuel holding pack used in a fuel cartridge for a fuel cell according to an aspect of the present invention.
Figure 10B:
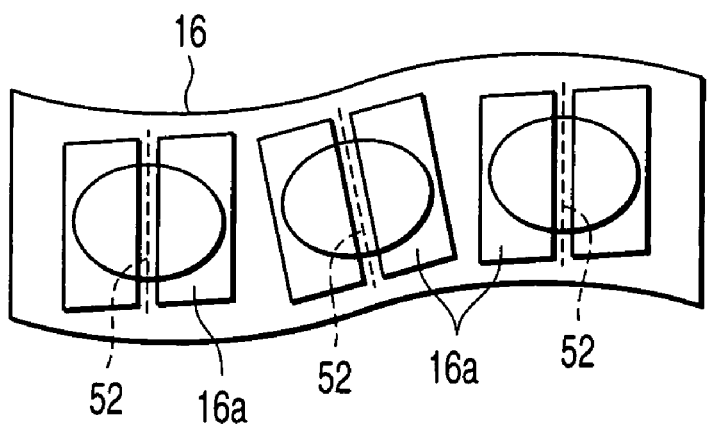

As shown in FIG. 10A and FIG. 10B, a breaking line 52 can be formed on each of the fuel holding packs 16*a* of the fuel holding pack belt 16. The breaking line 52 makes each of the fuel holding packs 16*a* break easily when the fuel holding pack 16*a* is pushed by the various push members of the fuel holding pack opening mechanism according to the invention. As shown in FIG. 10A, the breaking line 52 can extend in a direction in which the fuel holding pack belt 16 is conveyed, or, as shown in FIG. 10B, the breaking line 52 can extend in a direction crossing the direction in which the fuel holding pack belt 16 is conveyed.

Figure 10C:
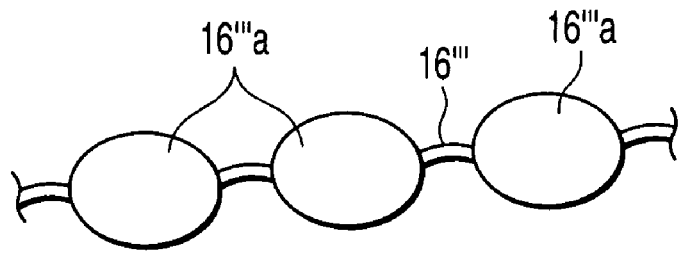

In FIG. 10C, a plurality of fuel holding packs 16'''*a* which are independent of one another are fixed to one another by a fuel holding pack belt 16'''. The fuel holding pack belt 16''' is smaller in width than that of each of the fuel holding packs 16'''*a* and has a flexibility. These fuel holding packs 16'''*a* are arranged at predetermined intervals in a longitudinal direction of a fuel holding pack belt 16''' on the fuel holding pack belt 16'''. A well known recording medium which records various information on the kind of fuel held in each of the fuel holding packs 16'''*a* can be attached on each surface of the fuel holding packs 16'''*a* or at a desired portion of the fuel holding pack belt 16'''.

[Modification of Fuel Holding Pack Opening Mechanism]

The fuel holding pack opening mechanism 24, 24', or 24" can be provided in the fuel cartridge 10, 10*a*, 10'*a*, or 50 for a fuel cell as explained above, and can be provided in the fuel cell 14, 14*a*, 14*b*, 14*c*, 14*d*, or 14*e*. In this case, the casing 12 or 12' is provided with an opening (not shown) for acting the push member 24*a*, 20'*c*, or 24"*a* of the fuel holding pack opening mechanism 24, 24', or 24" on the fuel holding pack 16*a*, 16'*a*, 16"*a*, or 16'''*a*. In a case that the fuel holding pack opening mechanism 24, 24', or 24" is provided in the fuel cell 14, 14*a*, 14*b*, 14*c*, 14*d*, or 14*e*, the fuel holding pack opening mechanism 24, 24', or 24" can be continuously used after the fuel cartridge 10, 10*a*, 10'*a*, or 50 for a fuel cell is exchanged. That is, the configuration of the fuel cartridge 10, 10*a*, 10'*a*, or 50 for a fuel cell can be simplified.

Incidentally, since the term "capillary force" defined in the present invention covers an assembly of irregular narrow tubes such as porous material used in the present invention, in a case of a narrow tube, the capillary force can be obtained by a known expression: the increasing height of liquid level $(Z)=2T\cos\theta/\rho gr$ [$\theta$: contact angle, T: surface tension, r: radius of narrow tube, $\rho$: liquid density, g: acceleration due to gravity] or the like. Since the term "capillary force" defined in the present invention cannot be flatly defined in a case of a porous material, "capillary force" is described as a force holding liquid in this case.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cartridge for a fuel cell, comprising:
   a casing configured to detachably connect to a predetermined position on the fuel cell and having a connecting port communicated with a fuel supply port of the fuel cell;
   a fuel holding pack belt housed in the casing and including a plurality of fuel holding packs holding fuels for the fuel cell, respectively, the fuel holding packs being arranged in a predetermined direction and connected to one another;
   a conveying mechanism configured to convey the fuel holding pack belt in the casing in the predetermined direction such that the fuel holding packs pass over the connecting port of the casing; and
   an opening mechanism opening the fuel holding pack corresponding to the connecting port of the casing,
   wherein
   the fuel holding pack belt can flex along the predetermined direction, and
   the fuel in the fuel holding pack is supplied to the fuel supply port of the fuel cell.

2. The fuel cartridge according to claim 1, wherein the opening mechanism pushes the fuel holding pack corresponding to the connecting port of the casing toward the fuel supply port of the fuel cell to open the corresponding fuel holding pack.

3. The fuel cartridge according to claim 1, wherein a breaking line is formed on the fuel holding pack.

4. The fuel cartridge according to claim 1, wherein the fuel holding packs of the fuel holding pack belt hold plural kinds of fuels.

5. The fuel cartridge according to claim 1, wherein the conveying mechanism includes a pair of rotation shafts, each having both end portions rotatably supported by the casing,
   the fuel holding pack belt has one end portion positioned in the predetermined direction, the other end portion positioned in a direction opposite to the predetermined direction, and a long and narrow intermediate portion between the one end portion and the other end portion,
   the one end portion of the fuel holding pack belt is fixed to one of the rotation shafts, while the other end portion of the fuel holding pack belt is fixed to the other rotation shaft and the intermediate portion is wound on the other rotation shaft, and
   the intermediate portion of the fuel holding pack belt wound around the other rotation shaft is wound up by the one rotation shaft, so that the fuel holding packs are conveyed in the predetermined direction and passed over the connecting port of the casing.

6. The fuel cartridge according to claim 1, wherein a plurality of fuel holding pack belts are housed in the casing, and the conveying mechanism conveys the fuel holding pack belts in the predetermined direction such that the fuel holding pack belts pass over the connecting port of the casing.

7. The fuel cartridge according to claim 6, wherein the conveying mechanism includes plural pairs of rotation shafts corresponding to the plural fuel holding pack belts, each rotation shaft having both end portions rotatably supported by the casing,
   each of the fuel holding pack belts has one end portion positioned in the predetermined direction, the other end portion positioned in a direction opposite to the predetermined direction, and a long and narrow intermediate portion between the one end portion and the other end portion,
   one end portion of each fuel holding pack belt is fixed to one rotation shaft of a corresponding pair of rotation shafts, the other end portion of each fuel holding pack belt is fixed to the other one of the corresponding pair of rotation shafts, and the intermediate portion of each fuel holding pack belt is wound around the other one of the corresponding pair of rotation shafts, and the intermediate portion of each fuel holding pack belt wound around the other one of the corresponding pair of rotation shafts is wound up by the one of the corresponding pair of rotation shafts, so that the fuel holding packs of each fuel holding belt are conveyed in the predetermined direction and passed over the connecting port of the casing.

8. The fuel cartridge according to claim 1, wherein the fuel holding pack belt includes a recording medium in which information corresponding to a kind of a fuel held in each of the fuel holding packs is recorded, and the fuel cartridge further comprises a fuel holding pack belt conveying unit configured to read the information recorded in the recoding medium and control a conveyance of the fuel holding pack belt performed by the conveying mechanism on a basis of the read information so that a fuel holding pack holding a desired kind of fuel corresponds to the connecting port of the casing.

9. A fuel cell, configured to be detachably connected with the fuel cartridge for a fuel cell according to claim 1 at a predetermined position, and including a fuel supply port to be supplied with fuel from the connecting port of the casing of the fuel cartridge detachably connected to the predetermined position, the fuel cell comprising:

a fuel absorber provided in the fuel supply port and absorbing the fuel supplied from the fuel cartridge.

10. The fuel cell according to claim 9, wherein an opening and closing device is provided in the fuel supply port, the opening and closing device is opened while the connecting port of the casing of the fuel cartridge is in communication with the fuel supply port and closed while the connecting port of the casing of the fuel cartridge is separated from the fuel supply port.

11. The fuel cell according to claim 9, wherein a fuel holding pack breaking and opening member is provided in the fuel supply port to abut on the fuel holding pack so that the fuel holding pack is broken and opened.

12. The fuel cell according to claim 9, wherein the fuel absorber includes a recess opening at an entrance of the fuel supply port and reducing in sectional area with being separated from the entrance, and the fuel holding pack corresponding to the connecting port of the casing is pushed into the recess of the fuel absorber of the fuel supply port and opened by the opening mechanism, so that the fuel in the fuel holding pack is supplied to the fuel supply port of the fuel cell.

13. The fuel cell according to claim 12, wherein capillary force at a portion of the fuel absorber adjacent to the entrance of the fuel supply port is larger than capillary force at a portion of the fuel absorber distant from the entrance of the fuel supply port.

14. The fuel cell according to claim 9, wherein the fuel absorber includes a recess opened toward an entrance of the fuel supply port and a projection provided in the recess and projecting toward the entrance, the fuel holding pack corresponding to the connecting port of the casing is pushed into the recess of the fuel absorber in the fuel supply port by the opening mechanism, pushed on a projecting end of the projection in the recess, and opened, so that the fuel in the fuel holding pack is supplied to the fuel supply port of the fuel cell.

15. The fuel cell according to claim 14, wherein capillary force at a portion of the fuel absorber adjacent to the entrance of the fuel supply port is larger than capillary force at a portion of the fuel absorber distant from the entrance of the fuel supply port.

16. The fuel cell according to claim 9, wherein the fuel absorber includes a hard porous portion disposed adjacent to an entrance of the fuel supply port and an elastic portion disposed adjacent to the porous portion on a side opposite to the entrance of the fuel supply port and having small capillary force, and the fuel holding pack corresponding to the connecting port of the casing is pushed onto the porous portion of the fuel absorber in the fuel supply port and opened by the opening mechanism, so that the fuel in the fuel holding pack is supplied to the fuel supply port.

17. The fuel cell according to claim 16, wherein the fuel absorber further includes one more hard porous portion adjacent to the elastic portion on a side opposite to the entrance of the fuel supply port, and one more elastic portion adjacent to the one more hard porous portion on a side opposite to the entrance of the fuel supply port, the one more elastic portion having small capillary force.

18. The fuel cell according to claim 16, wherein the opening mechanism is configured to squeeze the fuel holding pack pushed onto the porous portion of the fuel absorber along the predetermined conveying direction of the fuel holding pack.

19. The fuel cell according to claim 16, wherein at least one projection is provided on a surface of the porous portion of the fuel absorber adjacent to the entrance of the fuel supply port, and the fuel holding pack corresponding to the connecting port of the casing is pushed to the at least one projection on the surface of the porous portion of the fuel absorber and opened by the opening mechanism, and the fuel in the fuel holding pack is supplied to the fuel supply port of the fuel cell.

* * * * *